United States Patent
Kuroda et al.

(10) Patent No.: US 10,881,909 B2
(45) Date of Patent: *Jan. 5, 2021

(54) TRAINING INSTRUMENT AND INPUT DEVICE

(71) Applicant: Nintendo Co., Ltd., Kyoto (JP)

(72) Inventors: Ryoji Kuroda, Kyoto (JP); Shinji Yamamoto, Kyoto (JP); Hiroki Ikuta, Kyoto (JP); Takanori Okamura, Kyoto (JP); Xiaoming Jin, Kyoto (JP); Hitoshi Tsuchiya, Kyoto (JP); Kazuhiro Hosoi, Kyoto (JP); Satoru Osako, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,327

(22) Filed: Sep. 25, 2019

(65) Prior Publication Data

US 2020/0016460 A1 Jan. 16, 2020

Related U.S. Application Data

(63) Continuation of application No. 15/487,803, filed on Apr. 14, 2017, now Pat. No. 10,471,303, which is a (Continued)

(30) Foreign Application Priority Data

Oct. 16, 2014 (JP) .................................. 2014-211713

(51) Int. Cl.
*A63B 24/00* (2006.01)
*A63F 13/245* (2014.01)
(Continued)

(52) U.S. Cl.
CPC ...... *A63B 24/0062* (2013.01); *A63B 21/4035* (2015.10); *A63B 23/0355* (2013.01);
(Continued)

(58) Field of Classification Search
USPC ........................................................ 463/37
See application file for complete search history.

(56) References Cited

U.S. PATENT DOCUMENTS 5,072,927 A 12/1991 Santos
5,342,273 A 8/1994 Plendl et al.
(Continued)

FOREIGN PATENT DOCUMENTS

CN 101143262 3/2008
CN 102243934 11/2011
(Continued)

OTHER PUBLICATIONS

U.S. Appl. No. 16/656,968, filed Oct. 18, 2019; Tamura et al.
(Continued)

*Primary Examiner* — Pierre E Elisca
(74) *Attorney, Agent, or Firm* — Nixon & Vanderhye PC

(57) ABSTRACT

A non-limiting example training instrument comprises a hollow main body formed of an aluminum alloy. The main body is constituted by two gripping portions opposite to each other with a space therebetween and a coupling portion coupling the two gripping portions. A load sensor is arranged in the coupling portion inside the main body. The load sensor is a load cell, a strain gauge affixed to an interior of the main body, and a part of the main body to which the strain gauge is affixed functions as a strain body. Therefore, if a user applies a force so as to bring the two gripping portions close to each other or a force so as to move the two gripping portions away from each other, a load thereof is detected by the load sensor.

28 Claims, 26 Drawing Sheets

Related U.S. Application Data continuation of application No. PCT/JP2015/076622, filed on Sep. 18, 2015.

(51) Int. Cl.
  *A63F 13/24* (2014.01)
  *A63B 21/00* (2006.01)
  *A63B 23/035* (2006.01)
  *A63B 71/06* (2006.01)
  *G09B 19/00* (2006.01)

(52) U.S. Cl.
  CPC ...... *A63B 24/0059* (2013.01); *A63B 24/0087* (2013.01); *A63B 71/0622* (2013.01); *A63F 13/24* (2014.09); *A63F 13/245* (2014.09); *G09B 19/003* (2013.01); *A63B 2024/0009* (2013.01); *A63B 2024/0068* (2013.01); *A63B 2071/065* (2013.01); *A63B 2071/0625* (2013.01); *A63B 2071/0655* (2013.01); *A63B 2208/02* (2013.01); *A63B 2208/0204* (2013.01); *A63B 2208/0223* (2013.01); *A63B 2208/0233* (2013.01); *A63B 2209/00* (2013.01); *A63B 2220/40* (2013.01); *A63B 2220/803* (2013.01); *A63B 2225/50* (2013.01); *A63B 2225/74* (2020.08); *A63B 2230/50* (2013.01)

(56) References Cited

U.S. PATENT DOCUMENTS

| | | | |
|---|---|---|---|
| 7,335,134 | B1 | 2/2008 | Lavelle |
| 10,471,303 | B2 | 11/2019 | Kuroda et al. |
| 2001/0021665 | A1 | 9/2001 | Gouji et al. |
| 2006/0260395 | A1 | 11/2006 | Feldman et al. |
| 2007/0091084 | A1 | 4/2007 | Ueshima et al. |
| 2008/0146336 | A1 | 6/2008 | Feldman |
| 2010/0004061 | A1 | 1/2010 | Merril et al. |
| 2010/0009760 | A1 | 1/2010 | Shimamura et al. |
| 2010/0210420 | A1 | 8/2010 | Chang et al. |
| 2011/0074665 | A1 | 3/2011 | Konishi |
| 2012/0010056 | A1 | 1/2012 | Chang |
| 2012/0129653 | A1 | 5/2012 | Shalev et al. |
| 2013/0157817 | A1 | 6/2013 | Green |
| 2014/0051518 | A1 | 2/2014 | Russo |
| 2014/0244722 | A1 | 8/2014 | Hayashi |
| 2015/0081057 | A1 | 3/2015 | Hamada et al. |
| 2016/0206957 | A1 | 7/2016 | Goslin et al. |
| 2017/0156662 | A1* | 6/2017 | Goodall ............... A61B 5/0036 |
| 2017/0177083 | A1 | 6/2017 | Alghooneh et al. |
| 2017/0203153 | A1* | 7/2017 | Sato ...................... A63B 69/36 |
| 2017/0216670 | A1 | 8/2017 | Kuroda et al. |
| 2017/0239520 | A1* | 8/2017 | Kodaira ............. A63B 71/0622 |
| 2018/0099218 | A1 | 4/2018 | Ikuta et al. |
| 2018/0193732 | A1 | 7/2018 | Kamata et al. |
| 2018/0200575 | A1* | 7/2018 | Nagaishi ............... G06T 11/206 |
| 2019/0314721 | A1 | 10/2019 | Nakayama et al. |

FOREIGN PATENT DOCUMENTS

| | | |
|---|---|---|
| CN | 105457316 | 4/2016 |
| CN | 106896912 | 6/2017 |
| JP | 2001-104636 | 4/2001 |
| JP | 2007-307284 | 11/2007 |
| JP | 2009-020656 | 1/2009 |
| JP | 2010-17405 | 1/2010 |
| JP | 2010-088724 | 4/2010 |
| JP | 2011-076440 | 4/2011 |
| JP | 2013-521975 | 6/2013 |
| JP | 2014-164657 | 9/2014 |
| JP | 2018-099430 | 6/2018 |
| JP | 2018-110680 | 7/2018 |
| KR | 10-0293879 | 9/2002 |
| WO | 2011/119052 | 9/2011 |
| WO | WO 2011/119052 | 9/2011 |
| WO | 2014/038049 | 3/2014 |
| WO | 2016/059943 | 4/2016 |
| WO | 2018/131239 | 11/2019 |

OTHER PUBLICATIONS

U.S. Appl. No. 16/656,994, filed Oct. 18, 2019; Niwa et al.
International Search Report for PCT/JP2015/076622, dated Dec. 22, 2015, 4 pages.
Extended European Search Report dated May 4, 2018 issued in European Application No. 15850661.8 (7 pgs.).
U.S. Appl. No. 16/656,991, filed Oct. 18, 2019; Niwa et al.

* cited by examiner

FIG. 20

REWARD INFORMATION

| DISTRIBUTING CONDITION ||||REWARD|
|---|---|---|---|---|
| TYPE | LEVEL (MENU) | SCORE (EVALUATION) | NUMBER OF CONTINUING DAYS | |
| ISOMETRIC | 1 | LESS THAN 80 POINTS | — | REWARD A |
| ISOMETRIC | 1 | EQUAL TO OR LARGER THAN 80 POINTS | — | REWARD B |
| ISOMETRIC | 2 | LESS THAN 80 POINTS | — | REWARD C |
| ISOMETRIC | 2 | EQUAL TO OR LARGER THAN 80 POINTS | — | REWARD D |
| ISOMETRIC | — | — | ONE WEEK | REWARD E |
| ISOMETRIC | — | — | ONE MONTH | REWARD F |
| ⋮ | ⋮ | ⋮ | ⋮ | ⋮ |
| SLOW TRAINING | 1 | LESS THAN 80 POINTS | — | REWARD M |
| ⋮ | ⋮ | ⋮ | ⋮ | ⋮ |
| SQUAT | BEGINNER CLASS | LESS THAN 80 POINTS | — | NONE |
| ⋮ | ⋮ | ⋮ | ⋮ | ⋮ |

RING SHAPE

SHAPE OF 8 WITH SIDEWAYS

TOP VIEW OF FIXTURE

TRAINING INSTRUMENT AND INPUT DEVICE

CROSS REFERENCE STATEMENT

This application is a continuation of application Ser. No. 15/487,803 filed Apr. 14, 2017, which is a continuation of International Application No. PCT/JP2015/076622 filed Sep. 18, 2015, which claims priority to Japanese patent application No. 2014-211713 filed on Oct. 16, 2014, the entire contents of each of which are hereby incorporated by reference in this application.

FIELD

This application describes a training instrument and an input device that detect at least a load.

SUMMARY

A first aspect is a training instrument comprising a main body, a load sensor, and a communication portion. The main body has two gripping portions opposite to each other with a space therebetween and a coupling portion that is non-movably joined to each of the two gripping portions and couples the two gripping portions. The load sensor is provided inside the main body, and configured to detect a load applied to the main body. The communication portion is configured to wirelessly transmit a detected value of the load sensor.

According to the first aspect, since the load applied to the gripping portions is detected, there are very little restriction in a posture of a user and a use manner, and it can be used for various training. Therefore, a range of training can be expanded.

A second aspect is the training instrument according to the first aspect, wherein the load sensor is configured to repeatedly detect the load applied to the main body, and the communication portion is configured to repeatedly transmit the detected value of the load sensor.

A third aspect is the training instrument according to the first aspect, further comprising an inertial sensor that is provided inside the main body and configured to detect at least one of a tilt and a motion of the main body. The communication portion is configured to transmit the detected value of the load sensor and a detected value of the inertial sensor.

According to the third aspect, the range of training can be expanded like the first aspect.

A fourth aspect is the training instrument according to the first aspect, further comprising a correction value storing portion. The correction value storing portion is configured to store a correction value of the detected value of the load sensor. For example, the correction value for eliminating an error between the load value of the load applied to the main body and the load value detected at that time by the load sensor is stored. The communication portion is configured to transmit a detected value of the load sensor corrected by using the correction value that is stored in the correction value storing portion.

According to the fourth aspect, since the detected value of the load sensor is corrected, it is possible to eliminate a measurement error due to individual differences of training instruments, for example.

A fifth aspect is the training instrument according to the first aspect, wherein the communication portion is configured to perform a communication with an external terminal.

According to the fifth aspect, it is possible to transmit the detected load to the external terminal.

A sixth aspect is the training instrument according to the fifth aspect, wherein the detection value of the load sensor is accumulated in the external terminal, and the external terminal comprises a calculation portion configured to perform the predetermined calculation processing with using the detected value of the load sensor accumulated for a predetermined time period.

According to the sixth aspect, it is possible to reduce the number of times of the calculation processing.

A seventh aspect is the training instrument according to the fifth aspect, wherein the external terminal is configured to present to a user at least one of load information based on the detected value of the load sensor and information based on the load information concerned.

According to the seventh aspect, the user can know easily whether the training is performed correctly.

An eighth aspect is the training instrument according to the fifth aspect, wherein the external terminal is configured to execute a predetermined application, and to present information related to a training method to a user.

According to the eighth aspect, since the user only needs to perform training according to the information related to a training method, even a user who does not know a training method can easily perform the training.

A ninth aspect is the training instrument according to the eighth aspect, wherein the external terminal is configured to execute the application, and to compare the load information based on the detected value of the load sensor with a predetermined value that is set in advance.

A tenth aspect is the training instrument according to the eighth aspect, wherein the external terminal is configured to execute the application, and to determine whether the load information based on the detected value of the load sensor exists within a predetermined range, and to present load correction information for urging the user to correct the load that is applied to the gripping portions when the load information exists out of the predetermined range.

According to the tenth aspect, since the external terminal urges the user to correct the load, it is possible to guide the user to apply a correct load.

An eleventh aspect is the training instrument according to the seventh aspect, wherein the external terminal is configured to calculate a training result (history) based on the load information as an index so as to present to the user.

According to the eleventh aspect, since the training result is presented to the user as an index, the user can perform training continuously while confirming the achievement of training.

A twelfth aspect is the training instrument according to the seventh aspect, wherein the external terminal is configured to perform presentation to the user by a screen display or a sound output.

According to the twelfth aspect, the presentation to the user is performed by the screen display or the sound output, and therefore, the user can know a content to be presented while performing the training.

A thirteenth aspect is the training instrument according to the fifth aspect, wherein the external terminal is configured to transmit at least one of the load information and the information obtained from the load information concerned to a server, and the server is configured to receive the at least one of the load information and the information obtained from the load information concerned, and to accumulate the same.

According to the thirteenth aspect, it is possible to manage on a side of a server at least one of the load information and the information obtained from the load information concerned.

A fourteenth aspect is the training instrument according to the thirteenth aspect, wherein the server is configured to accumulate at least one of the load information and the information obtained from the load information concerned for each user.

According to the fourteenth aspect, the server can provide a service per user.

A fifteenth aspect is the training instrument according to the fourteenth aspect, wherein the server is configured to transmit to the external terminal at least one of load information of a further user and information obtained from the load information concerned. The external terminal is configured to associate at least one of the load information of the user of the external terminal concerned and the information obtained from the load information concerned with at least one of the received load information of the further user and the information obtained from the load information concerned so as to present to the user. For example, a result of comparison of the load information of the user and the information obtained from the load information concerned with the load information of the further user and the information obtained from the load information concerned is presented to the user.

According to the fifteenth aspect, since at least one of the load information and the information obtained from the load information concerned is presented to the user in association with those of the further user, it seems that competitiveness of the user is encouraged and motivation to continue the training is enhanced, for example.

A sixteenth aspect is the training instrument according to the thirteenth aspect, wherein the server comprises a providing portion configured to provide a content or service to the external terminal based on at least one of the received load information and the information obtained from the load information concerned.

According to the sixteenth aspect, since the server provides a content or service to the external terminal at least, it is possible to enhance motivation to perform the training and the training continuously.

A seventeenth aspect is the training instrument according to the sixteenth aspect, wherein the server comprises a condition judging portion configured to judge whether at least one of the received load information and the information obtained from the load information concerned satisfies a predetermined condition. The providing portion is configured to provide the content or service to the external terminal when the condition judging portion judges that the predetermined condition is satisfied.

According to the seventeenth aspect, since the content or service is provided when satisfying the predetermined condition, it is possible to more enhance motivation to perform the training and the training continuously.

A eighteenth aspect is the training instrument according to the first aspect, further comprising a socket portion that is attached to the main body so that a part thereof is accommodated inside the main body, wherein the communication portion is provided inside the socket portion.

According to the eighteenth aspect, since the communication portion is provided inside the socket portion that is attached to the main body, the communication portion can be provided inside the main body.

A nineteenth aspect is a training instrument comprising a main body, a load sensor, and an inertial sensor. The main body has two gripping portions opposite to each other with a space therebetween and a coupling portion that is non-movably joined to each of the two gripping portions and couples the two gripping portions. The load sensor is provided inside the main body, and configured to detect a load applied to the main body. Then, the inertial sensor is provided inside the main body, and configured to detect at least one of a posture and a motion of the main body.

According also to the nineteenth aspect, a range of training can be expanded like the first aspect.

A twentieth aspect is the training instrument according to the first aspect, wherein the load sensor is configured to detect a first load acting in a direction to bring the two gripping portions close to each other or a second load acting in a direction to move the two gripping portions away from each other.

A twenty-first aspect is the training instrument according to the twentieth aspect, further comprising a load value storing portion configured to store a load value corresponding to the first load or the second load detected by the load sensor.

A twenty-second aspect is the training instrument according to the first aspect, wherein the load sensor is arranged in a position except the two gripping portions of the main body.

According to the twenty-second aspect, since the load sensor is arranged in a position other than the gripping portions, when the user holds the gripping portions to apply a load to the main body, the load sensor can detect the load.

A twenty-third aspect is the training instrument according to the first aspect, wherein the coupling portion is configured to couple the two gripping portions so that the main body forms a substantially U-letter shape, and the load sensor is arranged in a portion corresponding to a bottom side of the U-letter shape.

A twenty-fourth is the training instrument according to the first aspect, wherein the main body is formed in a hollow cylindrical shape.

According to the twenty-fourth aspect, it is possible to incorporate the load sensor and other electronic components in the main body.

A twenty-fifth aspect is the training instrument according to the twenty-fourth aspect, wherein the load sensor and the inertial sensor are arranged inside the main body.

A twenty-sixth aspect is the training instrument according to the first aspect, wherein in a cross-sectional shape of each of the gripping portions, an inner side that the two gripping portions are opposed is made narrow and an outer side is made wide.

According to the twenty-sixth aspect, each of the two gripping portions is formed in a shape that the user tends to apply a force.

A twenty-seventh aspect is the training instrument according to the first aspect, wherein each of the gripping portions is provided with a positioning portion for hand or finger of the user.

According to the twenty-seventh aspect, since the positioning portion is provided, when the user uses the training instrument, the user grips the same or approximately the same position each time. Therefore, it is possible to stably detect (measure) the load that is applied to the main body.

A twenty-eighth aspect is the training instrument according to the first aspect, wherein the main body is not plastically deformed.

A twenty-ninth aspect is the training instrument according to the first aspect, further comprising a power button on the main body, wherein the power button is arranged in a position except the two gripping portions.

According to the twenty-ninth aspect, the power button does not interfere with the training.

A thirtieth aspect is the training instrument according to the first aspect, further comprising at least one of a light emitting portion, a sound outputting portion and a vibrating portion on the main body.

According to the thirtieth aspect, it is possible to notify predetermined information to the user by at least one of light blinking, sound and vibration.

A thirty-first aspect is the training instrument according to the first aspect, wherein the main body contains a battery.

A thirty-second aspect is the training instrument according to the nineteenth aspect, wherein the inertial sensor is at least one of an acceleration sensor and a gyro sensor.

According to the thirty-second aspect, it is possible to detect a change of tilt (posture) and a motion of the training instrument. Therefore, a posture and a motion of the user who holds the training instrument can be detected.

A thirty-third aspect is the training instrument according to the first aspect, wherein the load sensor is a distortion sensor.

A thirty-fourth aspect is the training instrument according to the nineteenth aspect, wherein the distortion sensor is a load cell. For example, a strain gauge is affixed to an interior of the main body, and a portion of the main body to which the strain gauge is affixed functions as a strain body.

According to the thirty-fourth aspect, the load that is applied to the gripping portions can be detected with simple structure.

A thirty-fifth aspect is the training instrument according to the first aspect, further comprising an attaching portion for an assistance member.

According to the thirty-fifth aspect, since it is possible to further use the assistance member, the range of training can be further expanded.

A thirty-sixth aspect is the training instrument according to the first aspect, wherein the gripping portions and the coupling portion are integrally formed.

A thirty-seventh aspect is the training instrument according to the first aspect, wherein the gripping portions and the coupling portion are separately formed.

A thirty-eighth aspect is the training instrument according to the first aspect, wherein the gripping portions and the coupling portion are integrally formed by extrusion molding.

A thirty-ninth aspect is a training instrument, comprising a main body having two gripping portions held by both hand of a user; a load sensor that is provided inside the main body and configured to detect a load acting in a direction to bring the two gripping portions close to each other or a load acting in a direction to move the two gripping portions away from each other; a correction value storing portion configured to store a correction value of the detected value of the load sensor; and a communication portion configured to wirelessly transmit a detected value of the load sensor that is corrected by using the correction value that is stored in the correction value storing portion.

One or more of the features of the sixth to seventeenth aspects and features of the twentieth to thirty-eighth aspects can be suitably employed in this forty-eighth aspect.

A fortieth aspect is an input device of game apparatus, comprising a main body, a load sensor, a direction input portion, and a communication portion. The main body has two gripping portions held by both hands of a user and a coupling portion that is non-movably joined to each of the two gripping portions and couples the two gripping portions. The load sensor is provided inside the main body, and configured to detect a load applied to the main body. The direction input portion is provided within a range capable of being operated in a state where the user holds the gripping portions of the main body. The communication portion is configured to transmit to the game apparatus at least one of a detected value of the load sensor and an operation signal of the direction input portion.

According to the fortieth aspect, it is possible to provide a novel input device of a game apparatus, which inputs not only the signal of the direction input portion but a load.

BRIEF DESCRIPTION OF DRAWINGS

FIG. 20 is an illustration view showing non-limiting example reward information managed in a server shown in FIG. 18.

DESCRIPTION OF EMBODIMENTS

Figure 1:
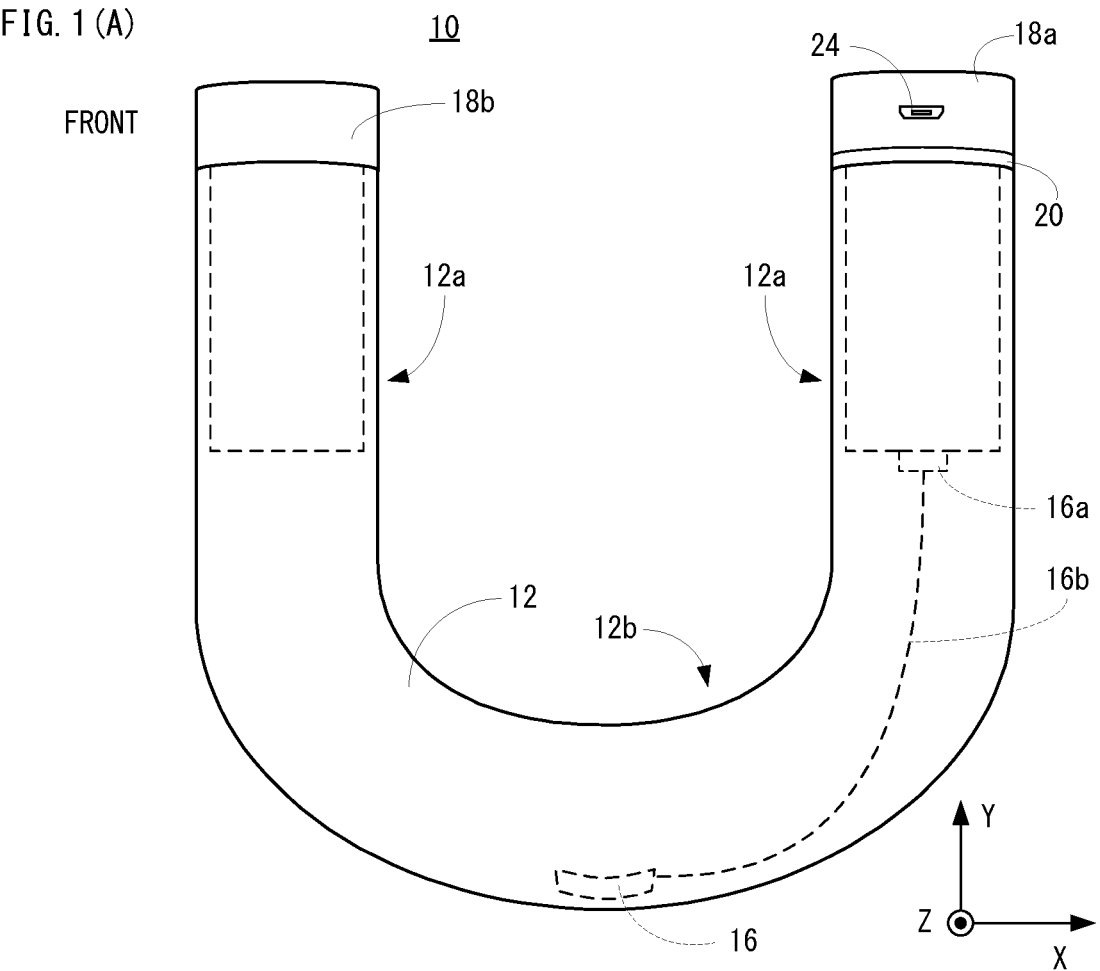
FIG. 1(A) is a front view of the training instrument viewed from the front.
FIG. 1(B) is a top view of the training instrument viewed from the above.
FIG. 1(C) is an illustration view showing an outline of a configuration of a socket portion provided on the training instrument.
Figure 1:
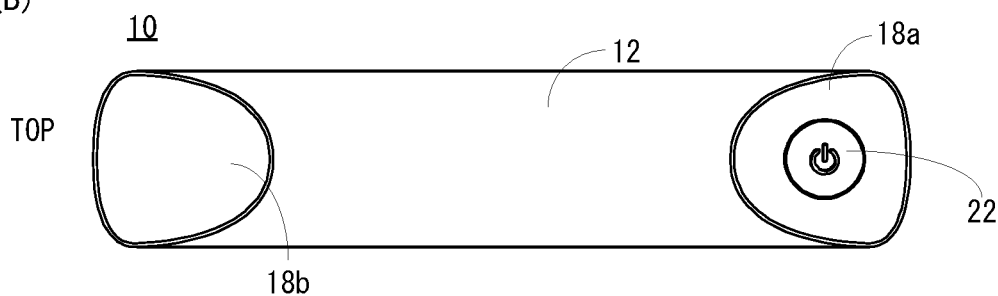
Figure 1:
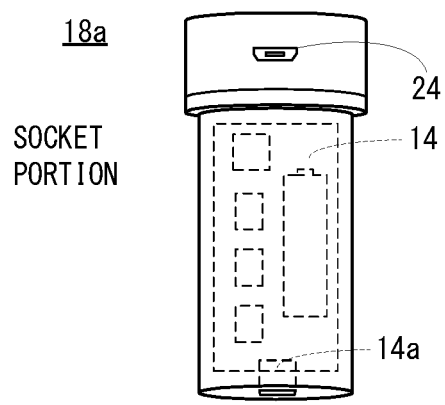

With referring to FIG. 1(A), a non-limiting example training instrument 10 of an embodiment comprises a hollow main body 12, and the main body 12 is constituted by two gripping portions 12a and a coupling portion 12b. As shown in FIG. 1(A), in this embodiment, the main body 12 is formed in a U-letter shape when viewing from the front. In this embodiment, the above-described gripping portions 12a are vertical bar portions of the U-letter of the main body 12, and the other portion (a curve line portion or curved portion of the U-letter) is the coupling portion 12b. That is, in this embodiment, the coupling portion 12b is non-movably coupled (joined) with each of the two gripping portions 12a. However, since the main body 12 of this embodiment is integrally formed by a molding method described later, in fact, a process that the two gripping portions 12a and the coupling portion 12b are coupled (joined) to each other is not performed.

In addition, it should be noted that each of the two gripping portions 12a and the coupling portion 12b may be separately and independently formed, and each of the two gripping portions 12a may be non-movably coupled or joined (fixed) to the coupling portion 12b.

In this embodiment, since it is used when a user performs training, an instrument or device (10) shown in FIGS. 1(A) and 1(B) is called a training instrument, but may be called a health appliance or sports equipment. Moreover, it may be also referred to as a measurement device that detects (measures) a load value, acceleration, angular velocity, etc. Furthermore, it may be referred to as a transmission device or an input device that transmits or inputs the measured load value, acceleration, angular velocity, etc. to an external terminal or apparatus.

Moreover, the main body 12 is formed of an aluminum alloy, for example, and a thickness of the aluminum alloy is set to approximately 3 mm. This is for preventing the main body 12 from being plastically deformed even if a force (load) is applied thereto, which pushes the two gripping portions 12a in an opposite direction (pushing the two vertical bars of the U-letter inwardly), or pulls the two gripping portions 12a in a direction reverse to the opposite direction (pulling the two vertical bars of the U-letter outwardly), or twists the two gripping portions 12a in a direction perpendicular to the opposite direction (twisting the two vertical bars of the U-letter in a back-and-forth direction). Strictly speaking, when a force greater than a predetermined magnitude (a load exceeding approximately 150 kg) is applied to the main body 12, the main body 12 may be deformed. However, the training instrument 10 of this embodiment is not used by athletes, it is assumed that ordinary men and women from the late teens to around 60 generations use it, and therefore, strength of the main body 12 is sufficient. That is, the main body 12 is excellent in durability.

However, it does not need to be limited to an aluminum alloy, and the main body 12 may be formed of titanium, stainless steel, carbon, etc.

For example, the main body 12 is formed by extrusion molding an aluminum alloy into a pipe shape having a predetermined cross-sectional shape, cutting the molded pipe at a predetermined length, and then subjecting the pipe to bending processing. However, the main body 12 may be formed by injection molding. That is, the main body 12 is integrally molded. As seen from FIG. 1(B) that the training instrument 10 is viewed from the above, in this embodiment, the predetermined cross-sectional shape is a triangle with rounded corners. Moreover, the main body 12 is formed so that one vertex of the triangle that is a cross-sectional shape faces (located inside) on the two gripping portions 12a when bending the pipe. Therefore, a side opposing to that one vertex becomes in a direction reverse to a direction that the two gripping portions 12a face (located outer side).

Since the cross-sectional shape of the main body 12 is formed in such a manner, when the user holds the main body 12 (training instrument 10) by the both hands and applies a force that pulls the two gripping portions 12a outwardly (in a separating direction), a joint of a finger can be hooked on a side corresponding to the above-described one vertex of the triangle located an inside. Moreover, when the user holds the main body 12 by the both hands and applies a force that pushes the two gripping portions 12a inwardly, it is possible to press a palm against an outside surface that is opposed to the side that the finger is hooked. Therefore, the user easily imposes (applies) a force. However, the cross-sectional shape of the main body 12 is not necessarily limited to a triangular shape with rounded corners, and may be a circular shape, other polygonal shape (square, pentagon, hexagon, etc.) with rounded corners, etc.

Moreover, the main body 12 comprises a control board 14 and a load sensor 16 that are incorporated in the main body 12. As shown in FIG. 1(B), the load sensor 16 is arranged in a portion except the gripping portions 12a (the coupling portion 12b, in this embodiment), and is electrically connected to the control board 14 (processor 30) using a connector 16a and a cable 16b. In this embodiment, the load sensor 16 is arranged inside the lowermost portion of the main body 12 formed in the shape of a U-letter shape (portion corresponding to a bottom side of the U-letter), i.e., a portion that the main body 12 curves. As shown also in FIG. 1(A), the load sensor 16 is arranged in a position that is an inside of the main body 12 and an outer periphery side of the curved portion.

As shown in FIGS. 1(A) and 1(C), the control board 14 is provided inside a socket portion 18a inserted into one opening portion of the main body 12. The socket portion 18a (a socket portion 18b described later is also the same) is formed by a resin such as an epoxy resin, phenol resin, polyurethane, for example. Moreover, the connector 14a is provided with a connector 14a into which the connector 16a is inserted. Various kinds of circuit components described later are mounted in this control board 14 (see FIG. 3).

Moreover, as shown in FIGS. 1(A) and 1(C), the socket portion 18a is formed with a level difference that functions as a stopper when attached to the main body 12, and an LED lamp 20 of a ring shape is provided in this level difference portion. This LED lamp 20 is electrically connected to the control board 14 (processor 30).

Furthermore, as shown in FIG. 1(B), a power button 22 is provided on the socket portion 18a, and a depressing portion of the power button 22 is provided on an upper surface of this socket portion 18a. That is, the power button 22 is arranged in a position different from the gripping portions 12a. This power button 22 is also electrically connected to the control board 14 (processor 30). Since the power button 22 is provided in one end portion of the main body 12, and it does not become obstructive even if holding the main body 12. That is, the power button 22 is arranged in a position that does not become an obstacle of training. Therefore, it is possible to prevent the power button 22 from being accidentally depressed during training.

Furthermore, as shown in FIGS. 1(A) and 1(C), the socket portion 18a is provided with a connector 24 for connecting a charging cable for charging a secondary battery 34 (see FIG. 3) as described later.

Figure 2:
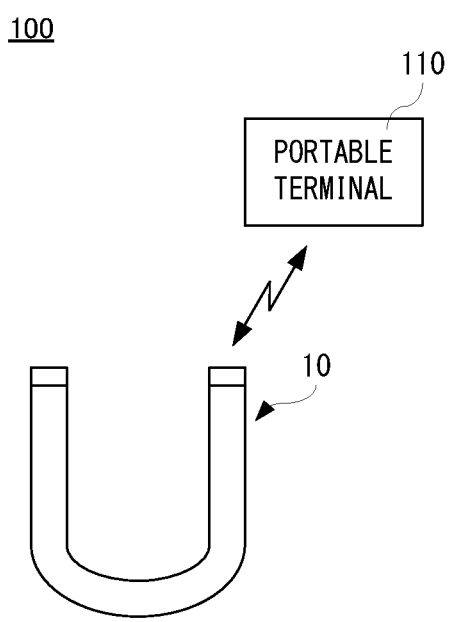
FIG. 2 is an illustration view showing a non-limiting example training system using the training instrument shown in FIG. 1.

FIG. 2 is an illustration view showing an example of a training system 100 using the training instrument 10 shown in FIG. 1. As shown in FIG. 2, the training system 100 includes the training instrument 10 and a portable terminal 110. The training instrument 10 and the portable terminal 110 are connected wireless-communicably. However, the training instrument 10 and the portable terminal 110 may be connected with a cable.

Figure 3:
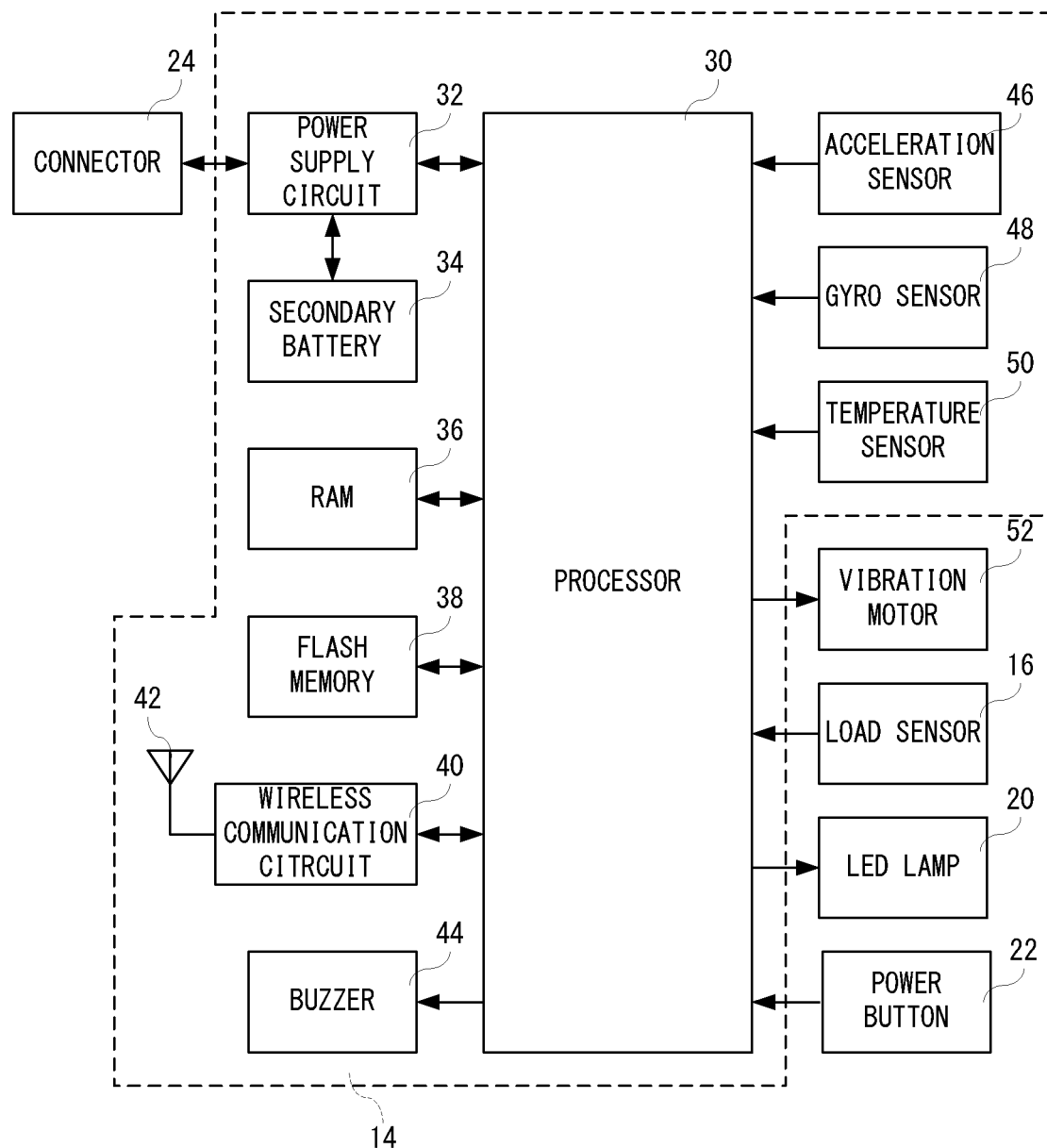
FIG. 3 is a block diagram showing non-limiting example electric structure of the training instrument shown in FIG. 1 and FIG. 2.

FIG. 3 is a block diagram showing electric structure of the training instrument 10 shown in FIG. 1 and FIG. 2. As shown in FIG. 3, the training instrument 10 includes a processor 30, and the processor 30 is connected with a power supply circuit 32, a RAM 36, a flash memory 38, a wireless communication circuit 40, a buzzer 44, an acceleration sensor 46, a gyro sensor 48, a temperature sensor 50 and a vibrating motor 52. Moreover, the above-described load sensor 16, LED lamp 20 and power button 22 are also connected to the processor 30. Furthermore, the power supply circuit 32 is connected with the above-described connector 24 and the secondary battery 34. Furthermore, an antenna 42 is connected to the wireless communication circuit 40.

Moreover, out of the circuit components shown in FIG. 3, the circuit components except the load sensor 16, the LED lamp 20, the power button 22, the connector 24 and the vibrating motor 52 are mounted on the above-described control board 14.

The processor 30 manages overall control of the training instrument 10. The power supply circuit 32 supplies a power supply (voltage) from the secondary battery 34 to respective circuit components under instructions of the processor 30. The power supply circuit 32 includes a charge control circuit, and a charging voltage obtained by stepping down and rectifying commercial power source is supplied to the charging control circuit via the charging cable and the connector 24, whereby the secondary battery 34 can be charged by the charging control circuit.

The RAM 36 is used as a buffer memory and a working memory of the processor 30. The flash memory 38 is a main storage of the training instrument 10, which stores a control program(s) of this training instrument 10, and stores information (correction value of load) unique of the training instrument 10, and stores the number of times of use of the training instrument 10 (number of measurement times of a load equal to or larger than a predetermined value).

The wireless communication circuit 40 has a short-distance wireless communication function and wirelessly communicates with a further device (the portable terminal 110, in this embodiment) via the antenna 42 under the control of the processor 30. In this embodiment, the wireless communication circuit 40 operates according to Bluetooth (registered trademark) standard. This is an example, and as the wireless communication circuit 40, a communication circuit that performs short distance wireless communication of a Wi-Fi (Wireless Fidelity) system. However, Wi-Fi is a name that has been certified by a predetermined certification organization concerning interconnectivity among wireless devices using communication standards of IEEE 802.11 series (IEEE 802.11a/b/g/n etc.). Otherwise, the wireless communication circuit 40 may adopt mobile communication that conforms to the standard (specification) such as 3G (third generation) or 4G (fourth generation). However, 4G is also called LTE (Long Term Evolution).

In addition, in a case where communication according to the Wi-Fi system or mobile communication is adopted, the training instrument 10 can communicate with a server 1002 described later directly or via a network 1004 (see FIG. 18).

The buzzer 44 is a general-purpose small electronic buzzer. The buzzer 44 is sounded under control of the processor 30.

The acceleration sensor 46 is an example of a motion (inertial) sensor, and is a three-axis acceleration sensor of an electrostatic capacitance system, for example. However, as the acceleration sensor 46, acceleration sensors of other systems can be used. As shown in FIG. 1(A), the acceleration sensor 46 is provided in a manner capable of measuring an acceleration in a horizontal direction (an X-axis direction), an acceleration in a vertical direction (a Y-axis direction) and an acceleration in a depth direction (a X-axis direction) when viewed the training instrument 10 from the front. Data of the measured (detected) accelerations are given to the processor 30. Therefore, based on the acceleration detected by the acceleration sensor 46, at least one of a tilt (posture) and motion of the main body 12 can be detected.

The gyro sensor 48 is an example of a motion (inertial) sensor, and is a three-axis gyro sensor of a piezo-electric vibration type, for example. However, as the gyro sensor 48, gyro sensors of other systems can be used. The gyro sensor 48 is provided in a manner capable of measuring each of angular velocities around the X axis, the Y axis and the Z axis for the training instrument 10. Data of the measured (detected) angular velocities are given to the processor 30. Therefore, based on the angular velocity detected by the gyro sensor 48, at least one of a tilt (posture) and motion of the main body 12 can be detected.

The temperature sensor 50 is a general-purpose semiconductor temperature sensor, and measures a temperature of environment where the training instrument 10 is used (strictly, an inside of the main body 12). Data of the measured (detected) temperature is given to the processor 30.

The vibrating motor 52 is a motor (eccentric motor) that is attached with an eccentric weight, and driven by the control of the processor 30. For example, the vibrating motor 52 is affixed to an interior of the main body 12. Therefore, if the vibrating motor 52 is driven, a vibration is generated and the vibration is propagated to the user who holds the main body 12 (training instrument 10).

The load sensor (distortion sensor) 16 is a load cell, and in this embodiment, a strain gauge is affixed to an interior of the main body 12, and a part of the main body 12 to which the strain gauge is affixed functions as a strain body. Data of the measured (detected) load is given to the processor 30.

The LED lamp 20 is a lighting device using a general-purpose LED(s), and includes one or two or more LEDs emitting blue light and one or two or more LEDs emitting red light, for example. In the LED lamp 20, each LED is controlled by the processor 30 so as to be turned on, turned off or blinked. Therefore, the LED lamp 20 is turned on in blue or red color, or blinked in blue or red color, for example.

The power button 22 is a push button, and inputs a signal to the processor 30 for turning on/off the power supply according to a depressing operation by the user. According to the signal for turning on/off the power supply, the processor 30 controls the power supply circuit 32, thereby to supply or stop the power supply to each circuit component.

Figure 4:
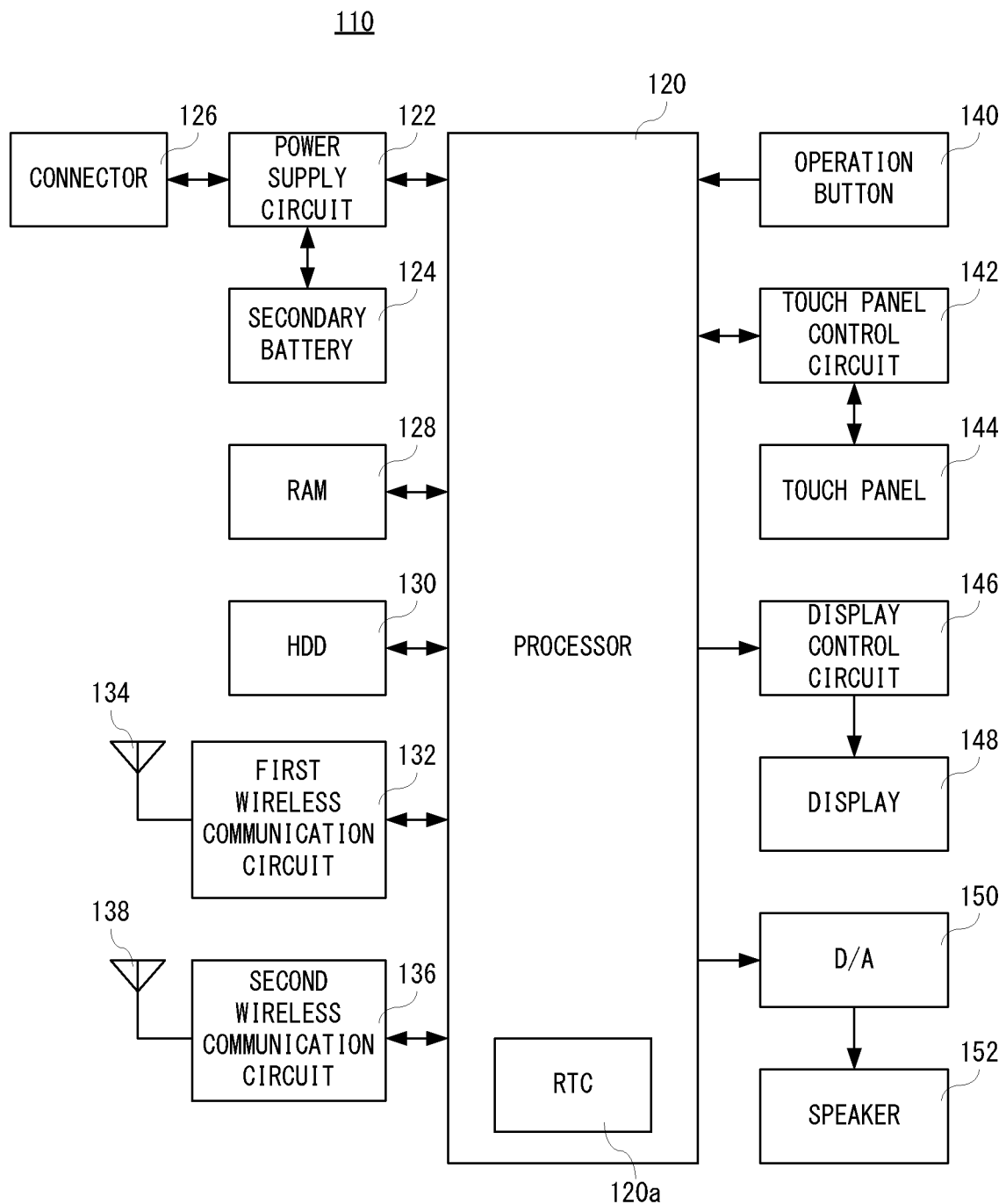
FIG. 4 is a block diagram showing non-limiting example electric structure of a portable terminal shown in FIG. 2.

FIG. 4 is a block diagram showing electric structure of the portable terminal 110 shown in FIG. 2. As shown in FIG. 4, the portable terminal 110 includes a processor 120, and this processor 120 is connected with a power supply circuit 122, a RAM 128, an HDD 130, a first wireless communication circuit 132, a second wireless communication circuit 136, an operation button 140, a touch panel control circuit 142, a display control circuit 146 and a D/A converter 150. Moreover, the power supply circuit 122 is connected with a secondary battery 124 and a connector 126. Furthermore, an antenna 134 is connected to the first wireless communication circuit 132, and an antenna 138 is connected to the second wireless communication circuit 136. Moreover, a touch panel 144 is connected to the touch panel control circuit 142. Furthermore, a display 148 is connected to the display control circuit 146. A speaker 152 is connected to the D/A converter 150.

The processor 30 manages overall control of the portable terminal 110. An RTC 120a is incorporated in the processor 30, and the RTC 120a measures (time counts) date and time (year, month, day, time). The power supply circuit 122 supplies a power supply (voltage) from a secondary battery 124 to respective circuit components under instructions of the processor 120. The power supply circuit 122 includes a charge control circuit, and a charging voltage obtained by stepping down and rectifying the commercial power source is supplied to the charging control circuit via the charging cable and a connector 126, whereby the secondary battery 124 can be charged by the charging control circuit.

The RAM 128 is used as a buffer memory and a working memory of the processor 120. The HDD 130 is a main storage of the portable terminal 110, which stores a control program(s) of this portable terminal 110, and stores an application program(s) installed in the portable terminal 110, and stores data such as data necessary to execute respective programs, etc. However, instead of the HDD 130, other nonvolatile memory such as a flash memory may be used.

The first wireless communication circuit 132 has a short-distance wireless communication function and wirelessly communicates with a further device via the antenna 134 under the control of the processor 120. In this embodiment, the further device is the training instruments 10. Moreover, in this embodiment, the first wireless communication circuit 132 operates according to Bluetooth (registered trademark) standard like the wireless communication circuit 40 of the training instrument 10. However, according to the communication standard of the wireless communication circuit 40, a communication circuit that performs a short-distance wireless communication of a Wi-Fi system as the first wireless communication circuit 132.

However, when the wireless communication circuit 40 of the training instrument 10 performs mobile communication according to the standard (specification) like 3G or 4G (LTE), the mobile communication according to the standard (specification) like 3G or 4G (LTE) is adopted also for this first wireless communication circuit 132.

Under the control of the processor 120, the second wireless communication circuit 136 can perform a short-distance wireless communication of a Wi-Fi system so as to connect to a wireless LAN through the antenna 138, whereby a wireless communication can be performed with a further device. In this embodiment, the further device is a server 1002 (see FIG. 18).

The operation button 140 includes various kinds of manual operation buttons each of which is constituted by a push button. For example, the operation button 140 includes a power button, a home button, a volume adjustment button, etc. It should be noted that the home button means a button for displaying a home screen or a main menu screen, and a function to return to a previous position is also assigned.

The touch panel control circuit 142 supplies a necessary voltage etc. to the touch panel 144, and detects a touch operation within a touch effective range of the touch panel 144, and outputs coordinate data indicative of a position of the touch operation to the processor 120. The touch panel 144 is provided associated with a display 148 described later. For example, the touch panel 144 is provided on a displaying surface of the display 148. Therefore, based on the coordinate data indicative of the position of touch operation, the processor 120 detects a position on the display 148, and determines images (GUI etc.) designated on the display 148.

In addition, the touch operation includes a touch, a release, a slide, a flick, etc. Moreover, the touch panel 144 is a general-purpose touch panel, and a touch panel of arbitrary systems, such as an electrostatic capacitance system, an electromagnetic induction system, a resistance film system, an infrared system, etc. can be used. In addition, the touch operation may be performed by not only a finger of the user but a stylus pen etc.

The display control circuit 146 includes a GPU, a VRAM, etc., and under instructions of the processor 120, the GPU produces display image data in the VRAM using image data such as polygon data, texture data, etc., and outputs the same to the display 148. The D/A converter 150 converts data for a voice or sound (music) (hereinafter, referred to as "sound data") applied from the processor 120 into an analog signal (sound signal) so as to output to the speaker 152.

In addition, the portable terminal 110 is a multifunctional information terminal, and various information processing terminals such as a smartphone, a tablet terminal, a notebook PC, a wearable terminal, etc. can be used as the portable terminal 110. However, when the portable terminal 110 is a smartphone, in the block diagram showing in FIG. 4, a circuit component for a telephone function is further provided.

In the training system 100 having such structure, an application program (hereinafter, called "training program") for performing training using the training instrument 10 is installed in the portable terminal 110. This training program is downloaded (acquired) by the portable terminal 110 from a server (1002 etc.) that provides various contents, for example. However, the training program may be installed in the portable terminal 110 from a medium such as a DVD, a USB memory, etc.

If the training program is started when a user operates the portable terminal 110, the portable terminal 110 performs connection processing with the training instrument 10. However, pairing is performed only when the connection processing is performed for the first time. For example, in the pairing, devices (in this example, the training instrument 10) existing within a range that a radio wave reaches is searched, and a user selects a device he/she wants to connect out of the searched devices and inputs the same identification number (authentication number) in both of the training instrument 10 and the portable terminal 110, whereby mutual authentication can be performed. However, in this embodiment, an identification number is set in advance, and when performing the pairing in the training instrument 10, the identification number is automatically input. Once the pairing is performed, the training instrument 10 and the portable terminal 110 will be automatically connected to each other after next time.

In addition, although illustration is omitted, at the time of first starting of the training program, prior to the above-described connection processing is started, a screen to which information of the user is to be registered is displayed, and information (user information) such as a user name, sexuality, an age and an address (mail address), etc. is registered in the screen concerned.

Figure 5A:
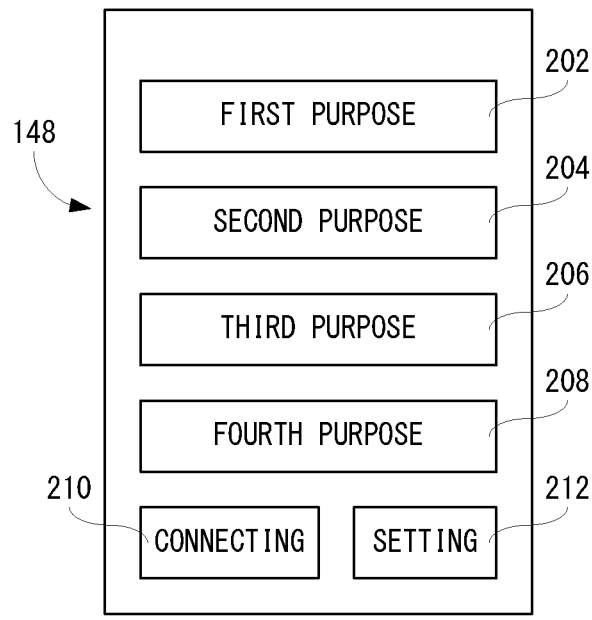
FIG. 5(A) is an example of a menu screen.

If performing the connection processing of the training instrument 10 and the portable terminal 110, a menu screen (initial screen) 200 as shown in FIG. 5(A), for example is displayed on the display 148. In addition, as described above, the touch panel 144 is provided on the displaying surface of the display 148. The same is applied in the following. However, if the connection processing is performed, after the user is notified of a connection result (success or failure), the menu screen 200 is displayed. If connection fails, it is possible to manually connect later.

As shown in FIG. 5(A), an icon 202, an icon 204, an icon 206 and icon 208 are displayed on the menu screen 200. Moreover, in the menu screen 200, an icon 210 and an icon 212 are displayed below the icon 208.

Each of the icons 202-208 is an icon for selecting a purpose of training set in advance. Although a first purpose, a second purpose, a third purpose and a fourth purpose are described in an example of the menu screen 200 shown in FIG. 5(A), a purpose of training may include, for example, a purpose of making a slender and tough body, a purpose of maintaining health, a purpose of preventing occurrence of a disorder in an exerciser, a purpose of preventing progress of disorder caused in an exerciser and a purpose of making a body that looks younger than age. When any one of the icons 202-208 is touched (selected), processing for performing training according to a purpose corresponding to a touched icon (202, 204, 206 and 208) is started as described later.

Moreover, the icon 210 is an icon for performing the connection processing manually. As described above, if the icon 210 is touched when the portable terminal 110 fails to connect with the training instrument 10, the connection processing is executed again.

Figure 5B:
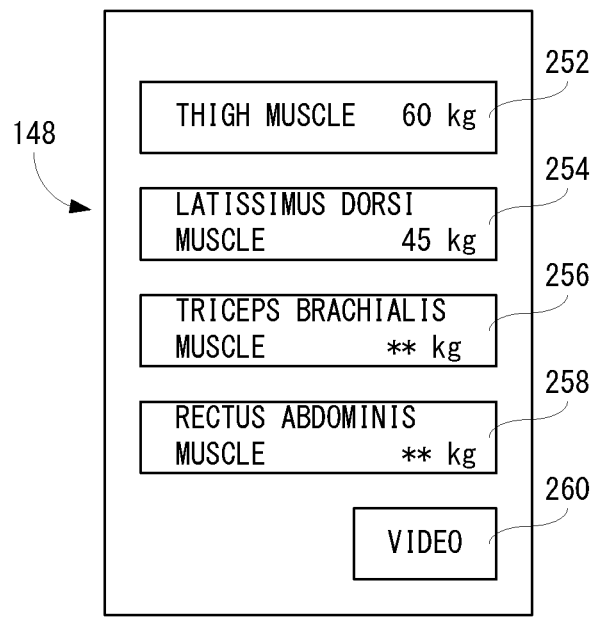
FIG. 5(B) is an example of a setting screen.

The icon 212 is an icon for setting (registering or change) information (muscle power information) about a muscle power of a part of the user. If this icon 212 is touched, a setting screen 250 as shown in FIG. 5(B) is displayed on the display 148. A display area 252, a display area 254, a display area 256 and a display area 258 are provided in the setting screen 250 aligned vertically. Moreover, an icon 260 is displayed on the setting screen 250 below the display area 258.

The display area 252 is an area for displaying (setting) a measured maximum load of a thigh muscle. The display area 254 is an area for displaying (setting) a measured maximum load of a latissimus dorsi muscle. The display area 256 is an area for displaying (setting) a measured maximum load of a triceps brachialis muscle. The display area 258 is an area for displaying (setting) a measured maximum load of a rectus abdominis muscle.

The user touches the display area (252, 254, 256 and 258) corresponding to a part (muscle) that he/she wants to set, and then, measures a maximum load of the part using the training instrument 10. In addition, data of a measurement value is transmitted to the portable terminal 110 from the training instrument 10. If completing the setting by the user, the setting screen 250 is non-displayed according to an operation by the user, and displaying is returned to the menu screen 200 shown in FIG. 5(A).

The icon 260 is an icon for displaying a video that explains a measurement method of measuring a maximum load of each part. For example, when the icon 260 is touched after the display area (252, 254, 256 and 258) corresponding to a part (muscle) to be set is touched, a video of the measurement method that measures the maximum load of the part to be set is displayed on the display 148.

When the icon 260 is touched, not only the measurement method but also a part (muscle) to be set may be displayed by illustration.

Moreover, there is no necessity that a maximum load of all the parts is set, and as for a part(s) not set, it is indicated that a maximum load thereof is not set by displaying a star mark (asterisk), for example.

Furthermore, it is not necessary to set a maximum load of each part at each time the training program is started.

Furthermore, since the maximum load of each part varies when continuing or interrupting the training, the training program prompts resetting of the maximum load as necessary.

Figure 6A:
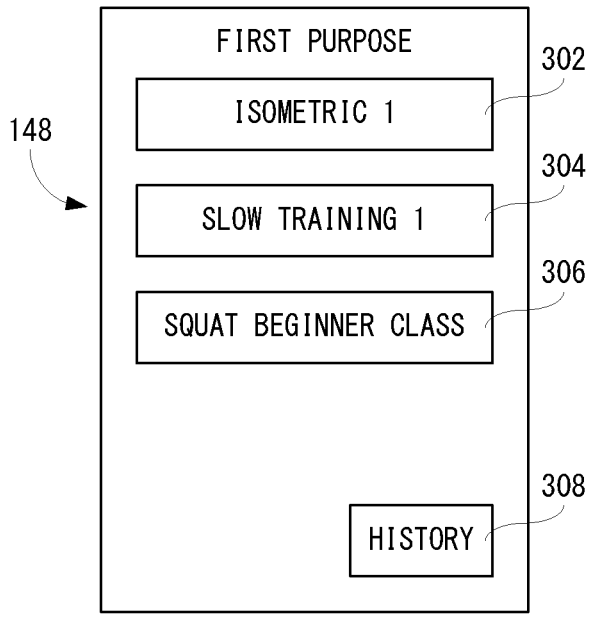
FIG. 6(A) is an example of a selection screen.

Returning to FIG. 5(A), if training for the first purpose is selected by touching the icon 202, for example, as shown in FIG. 6(A), a selection screen 300 capable of selecting contents of training for performing training with the first purpose is displayed on the display 148.

As shown in FIG. 6(A), an icon 302, an icon 304 and an icon 306 are displayed on the selection screen 300. Moreover, an icon 308 is displayed on a lower part of the selection screen 300. The icons 302-306 are icons for selecting training. Specifically, the icon 302 is an icon for selecting isometric 1. The icon 304 is an icon for selecting slow training 1. The icon 306 is an icon for selecting a squat beginner class.

In addition, numerals etc. added after a training name represent differences in levels and the contents (menu) of training.

Moreover, as for an item that the training has been already ended, a mark indicating it is displayed in a manner superposed on a corresponding icon (here, icons 302, 304 or 306), or the corresponding icon is displayed in a gray out manner. For example, when the same training is performed a predetermined number of times or a predetermined condition is satisfied by performing training, it is determined that the training is ended.

Moreover, the icon 308 is an icon for displaying a training history. For example, when the icon 308 is touched, the contents of the previous training or the past several training, the load and posture when performing the training, and accuracy of the posture when performing the training are displayed along with the year, month, day and time (date and time) when the training was performed. This is only an example, it should not be limited, and how to display a history is various, such as in graphs and tables. Since the training history (result) is thus presented as an index, it is thought that the user can know the outcome of the training, thereby to enhance motivation for continuously performing training. However, information that accumulates a result of training for every training is a training history.

Figure 6B:
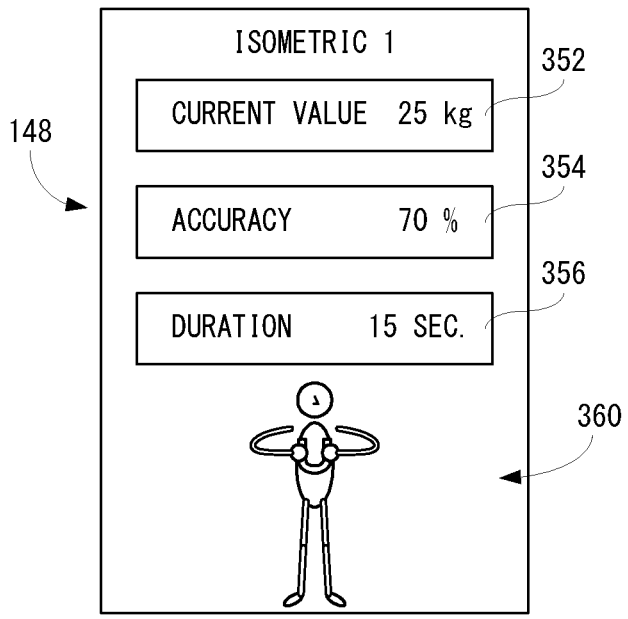
FIG. 6(B) is an example of a training screen.

In the selection screen 300 shown in FIG. 6(A), if the isometric 1 is selected by touching the icon 302, processing about training of this isometric 1 is started. As shown in FIG. 6(B), a training screen 350 for performing training of the isometric 1 is displayed on the display 148. Moreover, instructions about the training are output from the speaker 152 by voice if needed.

Then, that user can perform training while seeing the training screen 350 or hearing the voice that is output from the speaker 152. Therefore, even a beginner user who does not know training can perform training easily.

Moreover, during the training, the user uses the training instrument 10. The portable terminal 110 displays a current load value measured by the training instrument 10 on the display 148, and displays a posture of the user calculated based on at least one of the acceleration and the angular velocity both measured by the training instrument 10 on the display 148.

That is, the user can know whether an instructed load (load value) is applied to the training instrument 10, and can know whether a posture of him/her during the training is correct.

Moreover, a difference between the measured current load value and the instructed load value (target load value) is detected, and the accuracy of the load is calculated. Moreover, a difference between the calculated posture of the user and the correct posture of training is detected, and the accuracy of the posture is calculated. According to such the accuracy, advice on the training is presented to the user. Therefore, the user can adjust the load to be applied to the training instrument 10, and correct his/her posture in the training.

In addition, an acceleration and an angular velocity in a state where the user correctly holds the training instrument 10 and stands up with a posture that becomes a base (basic posture) are stored as a reference acceleration and a reference angular velocity, and by comparing them with a current acceleration and a current angular velocity, the current posture can be detected (calculated). However, in this embodiment, the posture means a tilt with respect to the horizontal plane or the vertical plane about a part of the user to be paid attention.

Returning to FIG. 6(B), display areas 352, 354 and 356 are provided in the training screen 350. Moreover, the display area 360 is provided below the display area 356. The display area 352 is an area for displaying the current load. Moreover, the display area 354 is an area for displaying the accuracy of the current posture. For example, the accuracy of the posture is an index that indicates whether an angle of the part the user pays attention becomes a correct angle. However, the angle of the part the user pays attention about the correct posture is set in the training program, and the accuracy is calculated in comparison with this. The same is applied in the following. Furthermore, the display area 360 is an area for displaying a way (method) of training (training of isometric, here) with an animation. In this embodiment, a way of training means how to have the training instrument 10 and the posture (angle of a part) or motion of the user at the time of training. The animation displayed in the display area 360 shows that the training instrument 10 is held by both hands in front of a chest, that a force is applied so that both hands are brought close to each other so as not to move the training instrument 10, and that a force is applied so that both hands are moved away from each other, for example. However, as described later, the display area 360 is used also when displaying using an avatar of the user the posture and motion of the user at the time of training. Therefore, for example, the user can know an appearance or situation of own training through the avatar. However, an avatar of the user may be used even when displaying the above-described training method with an animation. These are the same about other training screens 400, 450 and 500 described later.

Moreover, when starting processing of training, contents of instructions about the training concerned are output with a voice, as described above. For example, in the training of the isometric 1, a voice having contents such as "hold ΔΔ sec. with load of ○ ○ % of maximum load" is output from the speaker 152. However, about the contents of the instructions for the training may be displayed on the display 148 in a text, instead of a voice or together with a voice. The same applied in the following.

However, numerals correspond to ○ and Δ are values by taking a past training result into consideration, and automatically determined based on information of them by the training program so that excessive training can be prevented and the training can be performed safely. In the following, the same is applied to a case where the contents of instructions for further training are output with a voice.

Figure 7A:
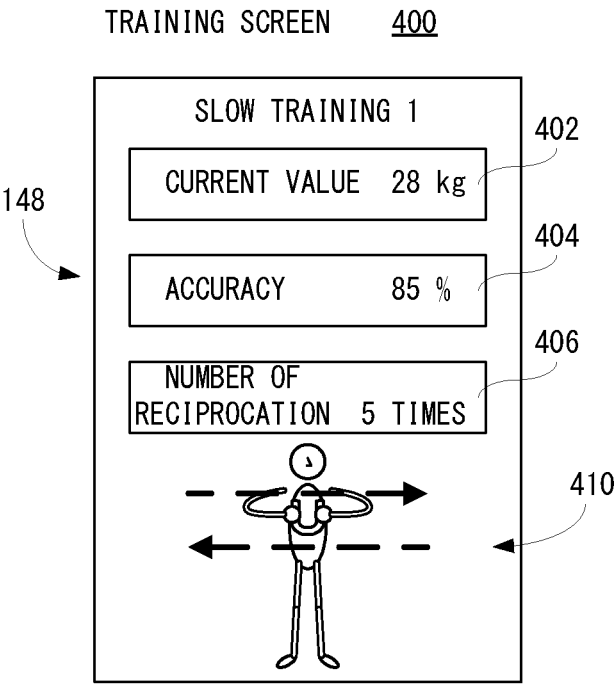
FIG. 7(A) is a further example of the training screen.

Moreover, FIG. 7(A) shows an example of a training screen 400 about the slow training 1, and FIG. 7 (B) shows an example of a training screen 450 about the squat beginner class. Furthermore, FIG. 8 shows an example of a training screen 500 for a squat upper class.

If the slow training 1 is selected by touching the icon 304 in the selection screen 300 of FIG. 6(A), the training screen 400 shown in FIG. 7(A) is displayed on the display 148. A display area 402, a display area 404 and a display area 406 are provided in the training screen 400. Moreover, a display area 410 is provided below the display area 406. The display area 402 is an area for displaying the current load. Moreover, the display area 404 is an area for displaying the accuracy of the current posture. Then, the display area 406 is an area for displaying the number of reciprocation times of the current motion. For example, it is possible to know the number of reciprocation times from a change in the acceleration detected by the acceleration sensor 46 provided in the training instrument 10 or a change in the angular velocity detected by the gyro sensor 48. In the slow training, since a kind of motion is reciprocated, when the motion is reversed, positive and negative signs before and after the motion are reversed in the detected acceleration in a certain axial direction and the detected angular velocity around an axis. Furthermore, the display area 410 is an area for displaying how to perform the slow training with an animation. The animation displayed in the display area 410 shows that the training instrument 10 is held by both hands in front of a chest, that a force is applied so that both hands are brought close to each other, and that a force is applied so that both hands are kept away from each other, and that the training instrument 10 is reciprocately moved by being slowly moved left and right in parallel with a floor (ground).

Moreover, in the slaw training 1, a voice having contents such as "move left and right with interval of Δ sec. with load of ◯◯ % of maximum load" is output from the speaker 152.

Figure 7B:
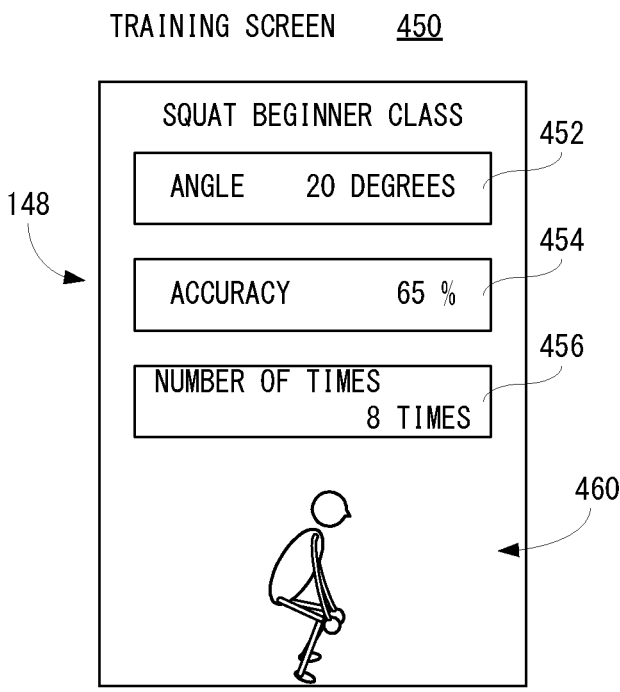
FIG. 7(B) is a still further example of the training screen.
Figure 8:
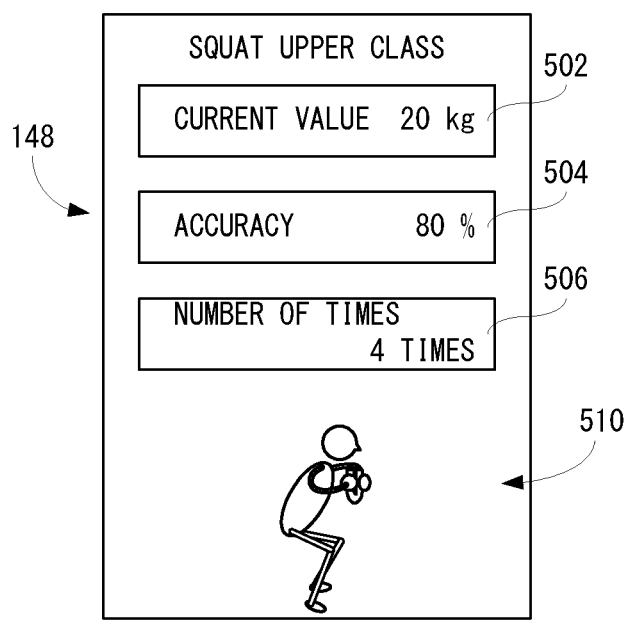
FIG. 8 is an illustration view showing the other non-limiting example training screen displayed on the portable terminal.

If the squat beginner class is selected by touching the icon 306 in the selection screen 300 of FIG. 6(A), the training screen 450 shown in FIG. 7(B) is displayed on the display 148. A display area 452, a display area 454 and a display area 456 are provided in the training screen 450. Moreover, a display area 460 is provided below the display area 456. The display area 452 is an area for displaying a current thigh angle. However, the angle is the thigh angle at the time of rendering a level (plane parallel to horizontal surface) 0 (zero) degrees, and when the user is standing upright, the angle becomes approximately 90 degrees, for example. Moreover, the display area 454 is an area for displaying the accuracy of the current posture. Then, the display area 456 is an area for displaying the number of times of squat. Furthermore, the display area 410 is an area for displaying how to perform a squat with an animation. The animation displayed in the display area 410 shows, for example, that from a standing upright state, bend and stretch so that the knee does not come out in front of the tiptoe, sitting down until the knee reaches 90 degrees, then return to the upright state.

In addition, although not shown in FIG. 7(B), in the squat beginner class, an animation of an appearance of squatting in a state where the training instrument 10 held by one hand is pressed against the thigh is displayed. At this time, an image of the training instrument 10 is displayed so that the vertical bars of the U-letter shape of the main body 12 are rendered in parallel with the thigh. Therefore, the number of squat times can be calculated from the number of times that the sign of the angular velocity around the X-axis of the gyro sensor 48 is reversed.

Moreover, in the squat beginner class, a voice having contents such as "move up and down with interval of Δ sec. while pressing training instrument against thigh" is output from the speaker 152.

For example, if the squat upper class is selected when a further purpose of training is selected, a training screen 500 shown in FIG. 8 is displayed on the display 148. A display area 502, a display area 504 and a display area 506 are provided in the training screen 500. Moreover, a display area 510 is provided below the display area 506. The display area 502 is an area for displaying the current load. Moreover, the display area 504 is an area for displaying the accuracy of the current posture. Then, the display area 506 is an area for displaying the number of squat times. Furthermore, the display area 510 is an area for displaying how to perform the squat with an animation. Although it is difficult to understand in the drawing, the animation displayed in the display area 510 shows that the training instrument 10 is held by both hands in front of a chest, that a force is applied so that both hands are brought close to each other, and that a force is applied so that both hands are kept away from each other, and that the squat is performed while holding the training instrument 10 in front of the chest.

In the squat upper class, on the assumption that the user can perform basic motion of the squat, the accuracy of an angle of an upper body (the accuracy of posture) in a state where a load of ◯◯ % of the maximum load is applied to the training instrument 10 is calculated. Therefore, in the squat upper class, the number of squat times can be calculated from a change of the acceleration of the Y-axis direction of the acceleration sensor 46.

Moreover, in the squat upper class, a voice having contents such as "move up and down with interval of Δ sec. while holding training instrument in front of chest with applying load of ◯◯ % of maximum load" is output from the speaker 152.

The training screens (200, 250, 300, 350, 400, 450 and 500) shown in FIG. 6-FIG. 8 are exemplified about some training, and should not be limited. A training screen is prepared for each training, and a design and contents of the training screen can be changed as appropriate.

Moreover, although loads and postures (angle of parts) detected during training are displayed as numerical values in FIG. 6-FIG. 8, the loads and postures may be displayed with images.

As an example, as described above, the current posture of the user during training is displayed using an avatar. Taking the case of the squat beginner class as an example, instead of an animation instructing training on the training screen 450, the current posture of the user is displayed in the display area 460 using an avatar.

Figure 9A:
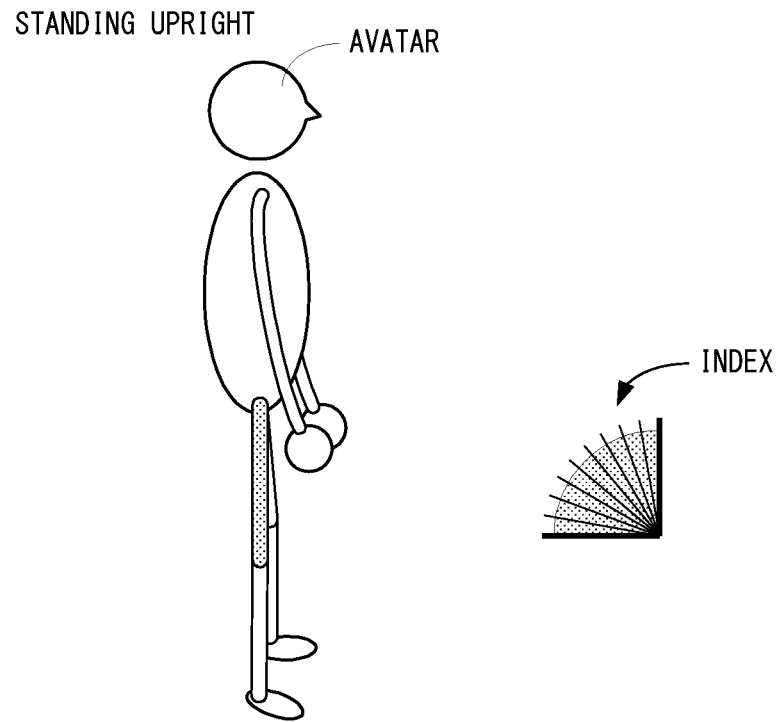
FIG. 9(A) is an illustration view that expresses with an avatar a posture of a user in a state where the user stands upright at time of squat.

For example, when the user stands upright, an upright avatar is displayed in the display area 460 as shown in FIG. 9(A), and it is indicated by an angle image displayed beside the avatar that its thigh forms an angle of 90 degrees with respect to the horizontal. In addition, the angle image means an image that a fan shape image having a size corresponding to the angle to be displayed is superimposed on an image imitating a part of a protractor.

Figure 9B:
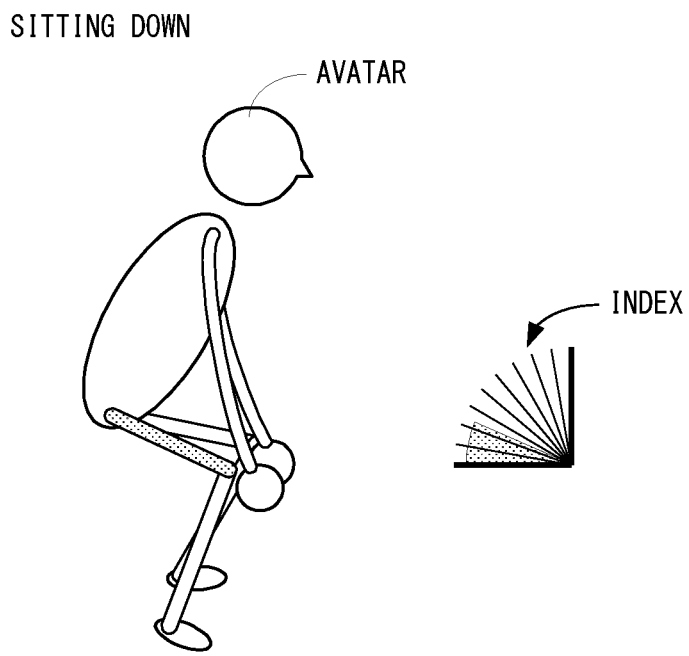
FIG. 9(B) is an illustration view that expresses with an avatar the posture of the user in a state where the user sits down at the time of squat.

Moreover, when the user bends the knee and drops the waist, as shown in FIG. 9(B), an avatar in a state where the waist is dropped is displayed in the display area 460, and an angle image showing an angle formed by its thigh with respect to the horizontal is displayed beside the avatar.

In this squat beginner class, a thigh of a right leg is a part to be paid attention, and measuring the angle of this part is instructed, and the user performs the squat while pressing the training instrument 10 against the thigh of the right leg.

Moreover, the detected posture (here, angle of thigh) is shown by a posture of the avatar and the angle image beside it. At this time, the avatar is displayed so that it can be visually recognized that a part to be paid attention is a thigh. A spot pattern is applied to the thigh of the right leg of the avatar in FIGS. 9(A) and 9(B).

Since the current posture of the user is thus presented using the avatar and the angle image, the user can know at a glance whether the posture is correct and at a glance how the posture should be corrected. Therefore, it is possible to lead the user so that effective training can be performed.

Moreover, based on the load and the accuracy of posture that are detected (calculated) during training, advice is presented to the user.

For example, when the detected load does not reach the instructed load, according to a difference therebetween, a voice such as "strongly" or "little more strongly" is output from the speaker 152. Inversely, when the detected load exceeds the instructed load, according to a difference therebetween, a voice such as "weakly" or "little more weakly" is output from the speaker 152. Moreover, when the detected load is the same or approximately the same as the instructed load, a voice such as "good" or "keep it" is output to the speaker 152.

Therefore, even if the user does not see the screen of the portable terminal 110, he/she can perform the training correctly by hearing advice with voice.

Furthermore, if ending the training, contents (trained part etc.), score or evaluation (index with ranking), etc. of this training are displayed on the display 148. However, the score or evaluation is calculated (determined) in accordance with the load, the accuracy of the posture, stability, the number of times, etc. Moreover, when some kind of reward is given (distributed) according to the performance of training or the training score or evaluation, information on the reward to be distributed is displayed on the display 148 along with the score (evaluation) of the training. For example, the reward may be an avatar item, a training program, a virtual coin that can be used in other application programs, etc. Detailed description of determination on whether a reward is to be distributed, distribution processing, etc. will be described later.

Figure 10:
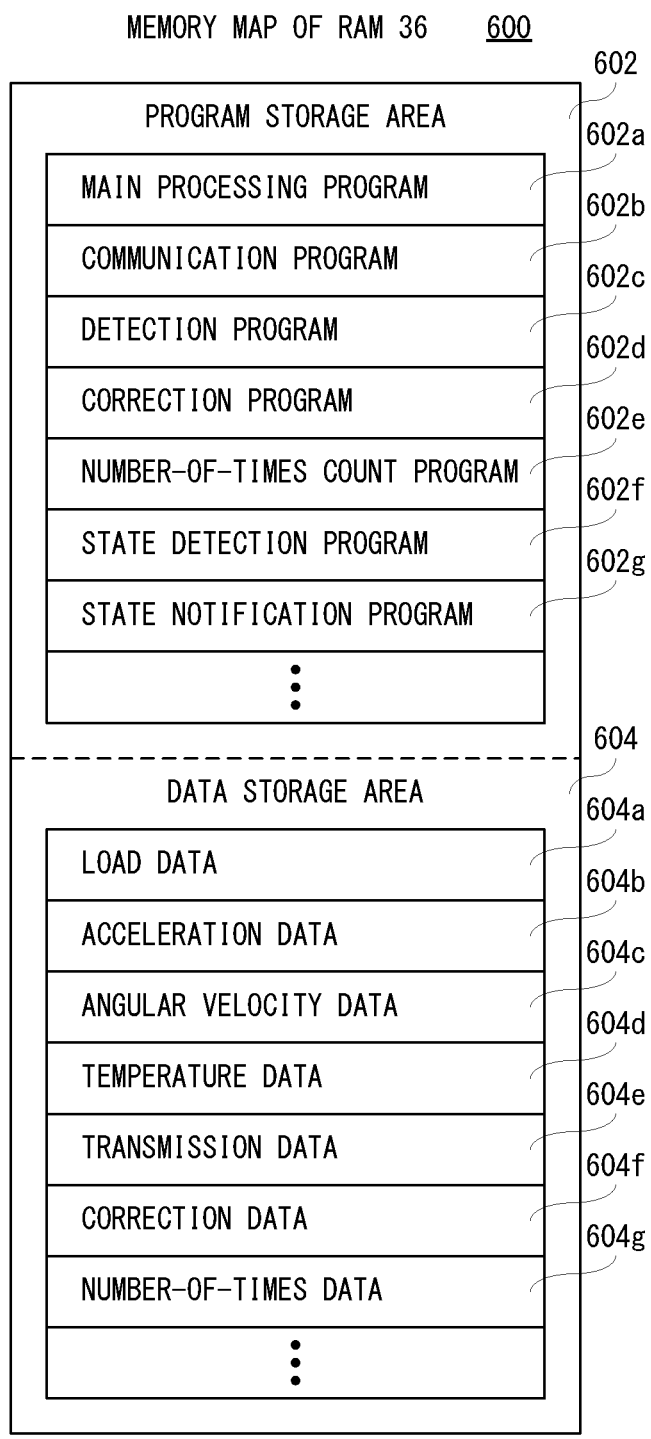
FIG. 10 is an illustration view showing a non-limiting example memory map of a RAM incorporated in the training instrument shown in FIG. 3.

FIG. 10 shows an example of a memory map 600 of the RAM 36 incorporated in the training instrument 10 shown in FIG. 3. As shown in FIG. 10, the RAM 36 includes a program storage area 602 and a data storage area 604. The program storage area 602 is stored with a control program of the training instrument 10. This control program is constituted by a main processing program 602a, a communication program 602b, a detection program 602c, a correction program 602d, a number-of-times count program 602e, a state detection program 602f, a state notification program 602g, etc.

The main processing program 602a is a program for processing a main routine that controls the training instrument 10. The communication program 602b is a program for performing communications with other apparatus (portable terminal 110 in this embodiment). The detection program 602c is a program for detecting measurement values of the load sensor 16, the acceleration sensor 46, the gyro sensor 48 and the temperature sensor 50. The correction program 602d is a program for correcting, using correction data 604f, the measurement value of the load sensor 16 detected according to the detection program 602c. At this time, the measurement value of the temperature sensor 50 is taken into consideration.

The number-of-times count program 602e is a program for counting the number of times (number of measurement times) that the load equal to or larger than a predetermined value (load causing deformation of the strain gauge) is detected by the training instrument 10. However, when the load is changed to the load equal to or larger than the predetermined value, the number of measurement times is counted, if the load equal to or larger than the predetermined value continues, the number of measurement times is not counted.

The state detection program 602f is a program that detects an operating state (start, stop, charge, communication, overload, etc.), a battery residual quantity and an exhaustion state of the training instrument 10. The start or stop of the training instrument 10 is detected based on a signal of on/off of the power button 22. Moreover, since the processor 30 performs transmission and reception, the processor 30 can grasp whether the training instrument 10 is under communication. The battery residual quantity can be known by detecting a voltage value of the secondary battery 34, for example. The exhaustion state is detected based on the number of measurement times detected according to the number-of-times count program 602e. The overload is detected if the measurement value of the load sensor 16 exceeds a predetermined threshold value (150 kg, for example).

The state notification program 602g is a program for notifying, by making operate at least one of the blinking of the LED lump 20, the sounding of the buzzer 44 and the driving of the vibration motor 52 according to various kinds of states such as the operating state, the battery residual quantity, the exhaustion state, the overload, etc. detected according to the state detection program 602f, the various kinds of states. For example, the LED 20 is controlled an emitting color and the lighting or blinking thereof. Moreover, the buzzer 44 is controlled the number of times of sounding and temporal duration thereof. Furthermore, the vibration motor 52 is controlled the number of driving times and temporal duration thereof. These controls are suitably performed according to a state to be notified. However, how to perform (notify) the control is determined in advance for each state.

Moreover, load data 604a, acceleration data 604b, angular velocity data 604c, temperature data 604d, transmission data 604e, correction data 604f and number-of-times data 604g are stored in the data storage area 604.

The load data 604a is data of a measurement value of the load sensor 16 detected by the detection program 602c. That is, it is data of a load (load value) applied to the main body 12. The acceleration data 604b is data of a measurement value of the acceleration sensor 46 detected by the detection program 602c. The angular velocity data 604c is data of a measurement value of the gyro sensor 48 detected by the detection program 602c. The temperature data 604d is data of a measurement value of the temperature sensor 50 detected by the detection program 602c.

The transmission data 604e is data to be transmitted to the portable terminal 110. In this embodiment, the transmission data 604e is data including the load data 604a that is corrected according to the correction program 602d, the acceleration data 604b and the angular velocity data 604c.

The correction data 604f is data for correcting the detected load data 604a. As described above, the main body 12 is formed by bending a pipe-shaped aluminum alloy, and the load sensor 16 (strain gauge) is affixed on an interior of the main body 12. Therefore, respective training instruments 10 (main body 12) have individual differences. Moreover, since a position where the load sensor 16 is affixed and the gripping portion 12a are separated from each other, what is actually detected is the moment of the force applied to the gripping portions 12a. Therefore, the correction data 604f includes data that corrects the load data 604a in order to absorb the individual difference etc. Such a correction value is determined based on a difference between the load measured by the load sensor 16 and the predetermined load actually applied to the main body 12. Moreover, an error occurs in the load detected by the load sensor 16 depending on the ambient temperature. Therefore, the correction data 604f includes data that corrects the load data 604a in order to absorb the error due to the temperature. However, the correction data 604f may be stored (saved) within the processor 30.

The number-of-times data 604g is data on the number of measurement times that is counted according to the number-of-times count program 602e when the load equal to or larger than or equal to the predetermined value is detected by the load sensor 16. Since the number of measurement times is cumulatively counted, when the power of the training instrument 10 is turned on, it is read from the flash memory 38 and stored in the RAM 36, and when the power of the training instrument 10 is turned off, stored in the flash memory 38. In addition, along with the number of measurement times, the load detected for each time may also be stored.

Although illustration is omitted, in the data storage area 604, data such as data of a lighting pattern of the LED lamp 20, data of a sounding pattern of the buzzer 44, data of a driving pattern of the vibrating motor 52, etc. are stored, and a timer(s) (counter(s)) and a flag(s) necessary to execute the control program are provided.

Figure 11:
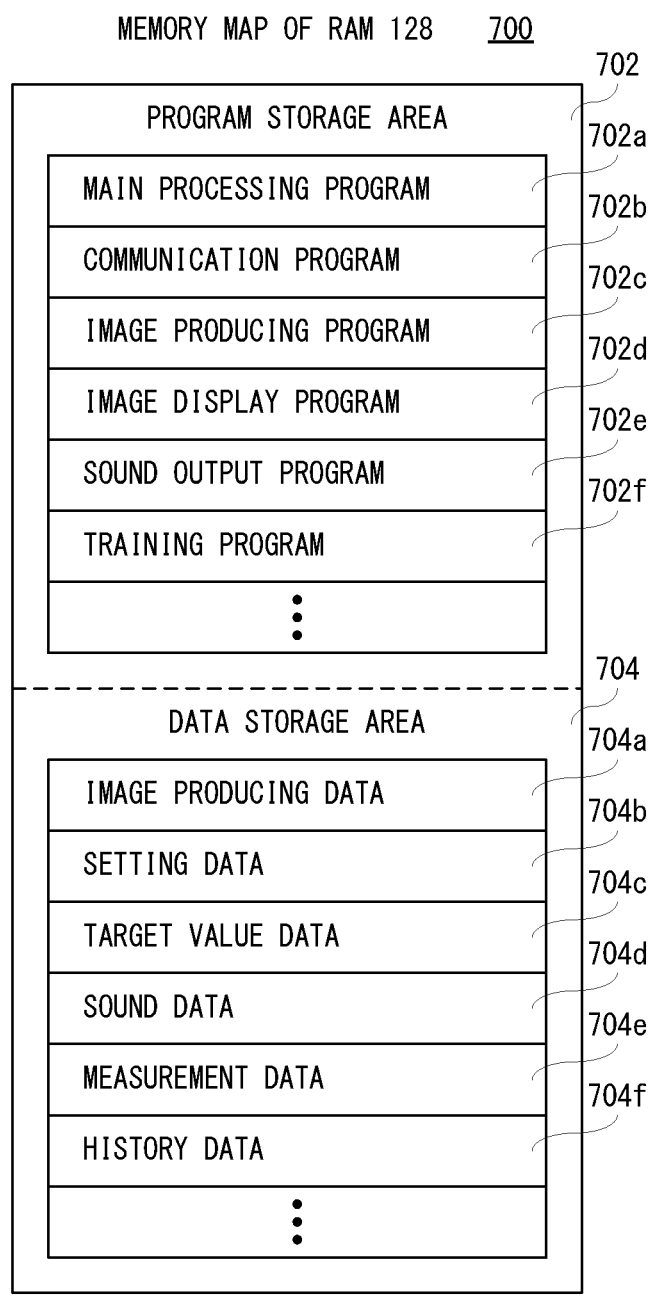
FIG. 11 is an illustration view showing a non-limiting example memory map of a RAM incorporated in the portable terminal shown in FIG. 4.

FIG. 11 shows an example of a memory map 700 of the RAM 128 of the portable terminal 110 shown in FIG. 4. As shown in FIG. 11, the RAM 128 includes a program storage area 702 and a data storage area 704. The program storage area 702 is stored with an information processing program of the portable terminal 110d. This information processing program is constituted by a main processing program 702a, a communication program 702b, an image producing program 702c, an image display program 702d, a sound output program 702e, a training program 702f, etc.

The main processing program 702a is a program for processing a main routine that controls the portable terminal 110. The communication program 702b is a program for performing communications with other apparatus (training instrument 10 in this embodiment) using the first wireless communication circuit 132, or with other apparatus (PC, a server, etc.) via the wireless LAN using the second wireless communication circuit 136.

The image producing program 702c is a program by which the GPU produces, on the VRAM, in the display control circuit 146 under instructions of the processor 120, display image data corresponding to various kinds of screens (200, 250, 300, 350, 400, 450, 500, etc.) to be displayed on the display 148 using image producing data 704a described later. The image display program 702d is a program by which the GPU outputs, in the display control circuit 146 under instructions of the processor 120, the display image data produced according to the image producing program 702c to the display 148.

The sound output program 702e is a program for outputting sound data 704d described later to the speaker 152 via the D/A converter 150. However, the sound data 704d is data for outputting a plurality of kinds of messages with a voice, and is output selectively.

The training program 702f is an application program for performing training of this embodiment.

Although illustration is omitted, in the program storage area 702, other application programs such as an application program about an email, are stored. Moreover, when the portable terminal 110 is a smartphone, a program for performing a telephone call function is also stored.

Moreover, image producing data 704a, setting data 704b, target value data 704c, sound data 704d, measurement data 704e and history data 704f are stored in the data storage area 704.

The image producing data 704a includes data for producing the display image data, such as polygon data, texture data, icon image data, animation data, avatar data, data of an avatar item, etc.

The setting data 704b is numeral data about a maximum load for each part that is set in the setting screen 250. However, NULL data is described for a part that the maximum load is not set.

The target value data 704c is numeral data about a target value of the maximum load for each part that is set by the training program 702f. For example, the target value is set, per purpose of training, based on the sexuality and age of the user, and a training history of the user and so on. However, the target value may be set by the user.

The sound data 704d is data about synthetic sound for outputting a plurality of messages instructing the contents of training and a plurality of messages for advising on training with a voice.

The measurement data 704e is data that the transmission data 604e transmitted from the training instrument 10 are stored according to the time series. That is, the measurement data 704e is data that the load data detected and corrected by the training instrument 10, the acceleration data and the angular velocity data are accumulated in time series.

The history data 704f is data on a training history, in which data concerning the date and time (time) of the training, a content of the training, a load (load value) and posture (also including acceleration and angular velocity) detected during the training and the accuracy of the posture when performing the training are described in time series for each training. As described above, if the icon 308 is touched in the selection screen 300, the training history is displayed on the display 148 according to the history data 704f. However, the date and time information included in the history data 704f is acquired from the RTC 120a when the transmission data 604e is received, and added to the transmission data 604e (measurement data 704e).

Although illustration is omitted, in the data storage area 704, other data required for execution of the information processing program is stored and a timer(s) (counter(s)) and a flag(s) are provided.

Figure 12:
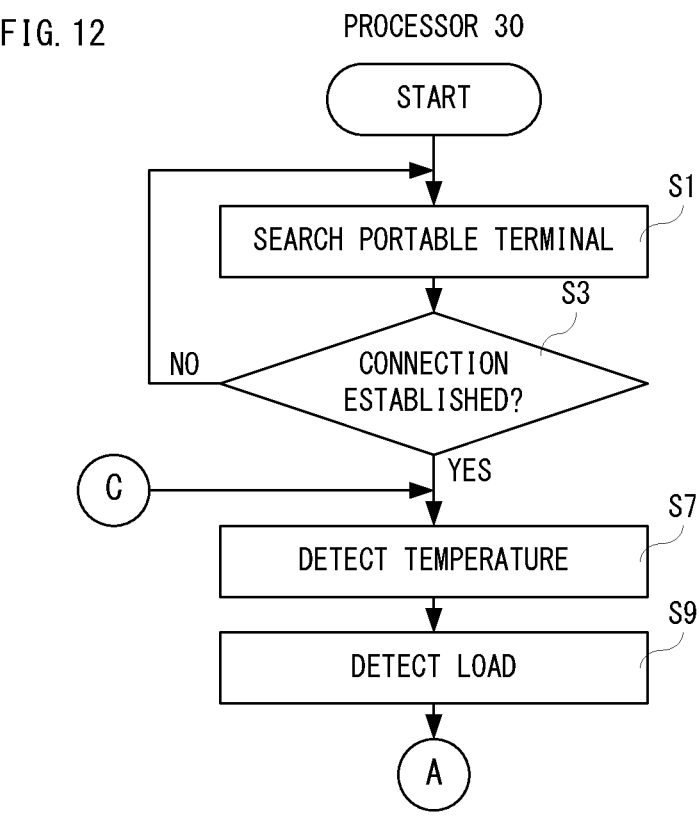
FIG. 12 is a flowchart showing a part of non-limiting example control processing of a processor incorporated in the training instrument shown in FIG. 3.
Figure 14:
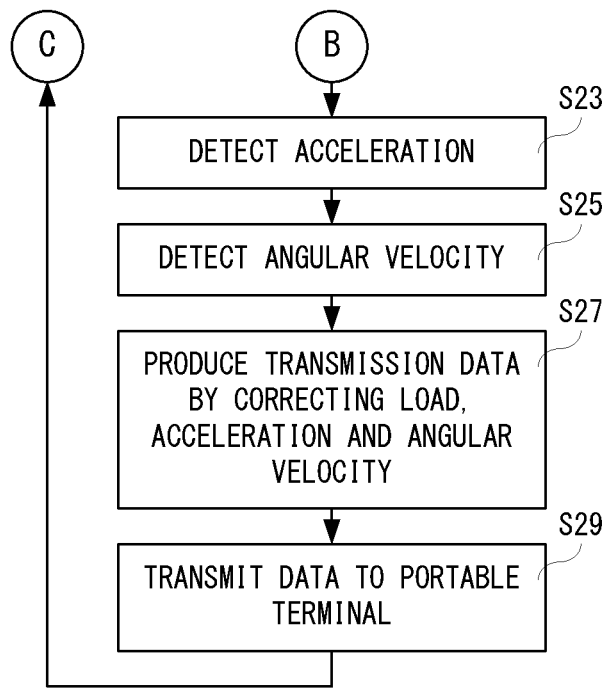
FIG. 14 is a flowchart of the other part of the non-limiting example control processing of the processor incorporated in the training instrument shown in FIG. 3, following FIG. 13.
Figure 13:
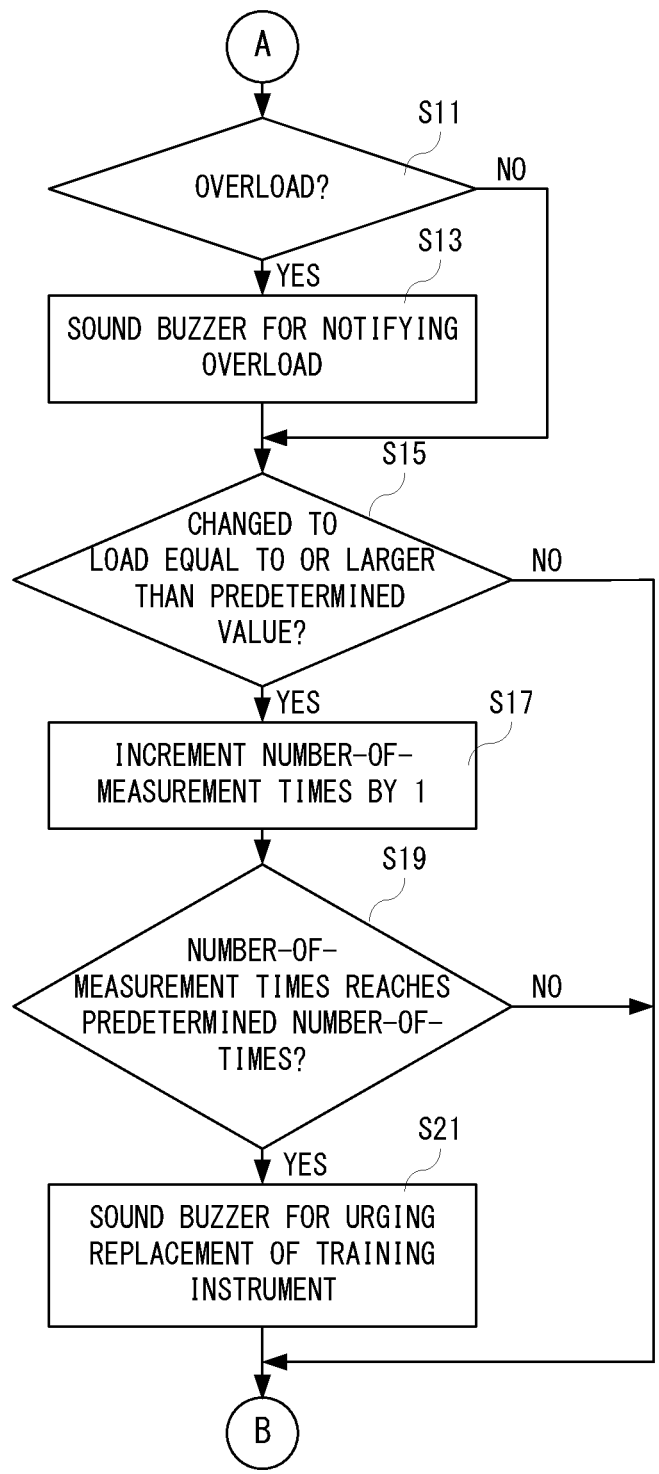
FIG. 13 is a flowchart of another part of the non-limiting example control processing of the processor incorporated in the training instrument shown in FIG. 3, following FIG. 12.

FIG. 12-FIG. 14 are flow charts of control processing of the processor 30 of the training instrument 10 shown in FIG. 3. In addition, it is pointed-out in advance that processing in respective steps in the flow charts shown in FIG. 12-FIG. 14 are mere examples, and if the same result is obtained, an order of the respective steps may be changed. Moreover, in this embodiment, it is assumed that the processor 30 executes the processing of each step of the flowcharts shown in FIG. 12-FIG. 14; however, some steps may be executed by a processor(s) other than the processor 30 or a dedicated circuit(s).

If the power button 22 is turned on by the user, the power supply of the training instrument 10 is turned on and the control program is executed, as shown in FIG. 12, the processor 30 starts the control processing. The processor 30 searches the portable terminal 110 in a step S1. In a next step S3, it is determined whether connection is established. If "NO" is determined in the step S3, that is, if connection is not established, the process directly returns to the step S1. However, as described above, when connection fails, connection processing can be manually performed on a side of the portable terminal 110 later, and therefore, if "NO" is determined in the step S3, after waiting for a predetermined time period, 10 seconds to 30 seconds, for example, the process may be returned to the step S1. On the other hand, if "YES" is determined in the step S3, that is, if connection is established, the process proceeds to a step S7.

In the step S7, a temperature is detected. That is, the processor 30 acquires a measurement value of the temperature sensor 50 and stores corresponding temperature data 604*d* into the data storage area 604. In a step S9, a load is detected. That is, the processor 30 acquires a measurement value of the load sensor 16 and stores corresponding load data 604*a* into the data storage area 604. Next, it is determined, in a step S11 shown in FIG. 13, whether there is an overload. Here, the processor 30 determines whether the load detected in the step S9 exceeds a maximum value (150 kg, for example) that a developer of the training instrument 10, etc. assumes.

If "NO" is determined in the step S11, that is, if there is no overload, the process directly proceeds to a step 15. On the other hand, if "YES" is determined in the step S11, that is, if there is an overload, in a step S13, in order to notify an overload, the processor 30 makes the buzzer 44 sound, and the process proceeds to the step S15. Although the buzzer 44 is sounded when notifying an overload, instead of the buzzer 44 sounding, the LED lamp 20 may be made to be lighted or blinked in a predetermined color, or the vibrating motor 52 may be made to be driven. Otherwise, an overload may be notified by any two or more of sounding of the buzzer 44, lighting (blinking) of the LED lamp 20 and driving of the vibrating motor 52. This is also true for a case where urging (informing) replacement of the training instrument 10 as described later.

It is determined, in the step S15, whether a load is changed to a load equal to or larger than a predetermined value. Here, the processor 30 determines whether a load detected by the load sensor 16 is changed from a load of 0 (zero) or less than the predetermined value to a load equal to or larger than the predetermined value. However, the predetermined value is a reference value used for judgment to urge the replacement of the training instrument 10, as described later.

If "NO" is determined in the step S15, that is, if the load is less than the predetermined value or the load equal to or larger than the predetermined value continues, the process directly proceeds to a step S23 shown in FIG. 14. On the other hand, if "YES" is determined in the step S15, that is, if the load is changed to a load equal to or larger than the predetermined value, the number of measurement times of the load is incremented by 1 (one) in a step S17, and it is determined, in a step S19, whether the number of measurement times reaches the predetermined number of times (15000 times, for example). If "NO" is determined in the step S19, that is, the number of measurement times does not reach the predetermined number of times, the process proceeds to the step S23. On the other hand, if "YES" in the step S19, that is, if the number of measurement times reaches the predetermined number of times, the buzzer 44 is made to be sounded in a step S21 in order to urge (notify) the replacement of the training instrument 10, and the process proceeds to the step S23.

Although detailed description is omitted, in the training instrument 10 of this embodiment, when the number of times that the load becomes equal to or larger than a predetermined value becomes the predetermined number of times (15000 times, for example), it is determined that a life of the training instrument 10 (load sensor 16) has come, and therefore, the replacement of the training instrument 10 is urged. This is because the load cannot be accurately measured due to metal fatigue of the main body 12 or deterioration of the load sensor 16 (strain gauge) or both factors.

An acceleration is detected in the step S23 shown in FIG. 14. That is, the processor 30 acquires a measurement value of the acceleration sensor 46 and stores corresponding acceleration data 604*b* into the data storage area 604. An angular velocity is detected in a step S25. That is, the processor 30 acquires a measurement value of the gyro sensor 48 and stores corresponding angular velocity data 604*c* into the data storage area 604. Then, in a step S27, transmission data 604*e* is produced by correcting the load, acceleration and angular velocity. Here, the processor 30 corrects with using the correction value the detected load with reference to the correction data 604*f*. Moreover, in the step S27, the transmission data 604*e* including the corrected load data 604*a*, acceleration data 604*b* and angular velocity data 604*c* is produced. Then, the transmission data 604*e* is transmitted to the portable terminal 110 in a step S29, and the process returns to the step S7 shown in FIG. 12.

In addition, although omitted in FIG. 12-FIG. 14, as described above, the processor 30 controls lighting/putting-out of the LED lamp 20 according to turning on/off of the power supply, and changes a color that the LED lamp 20 is lighted according to battery residual quantity. Moreover, the processor 30 makes the LED lamp 20 blink by a predetermined color during communication.

Figure 15:
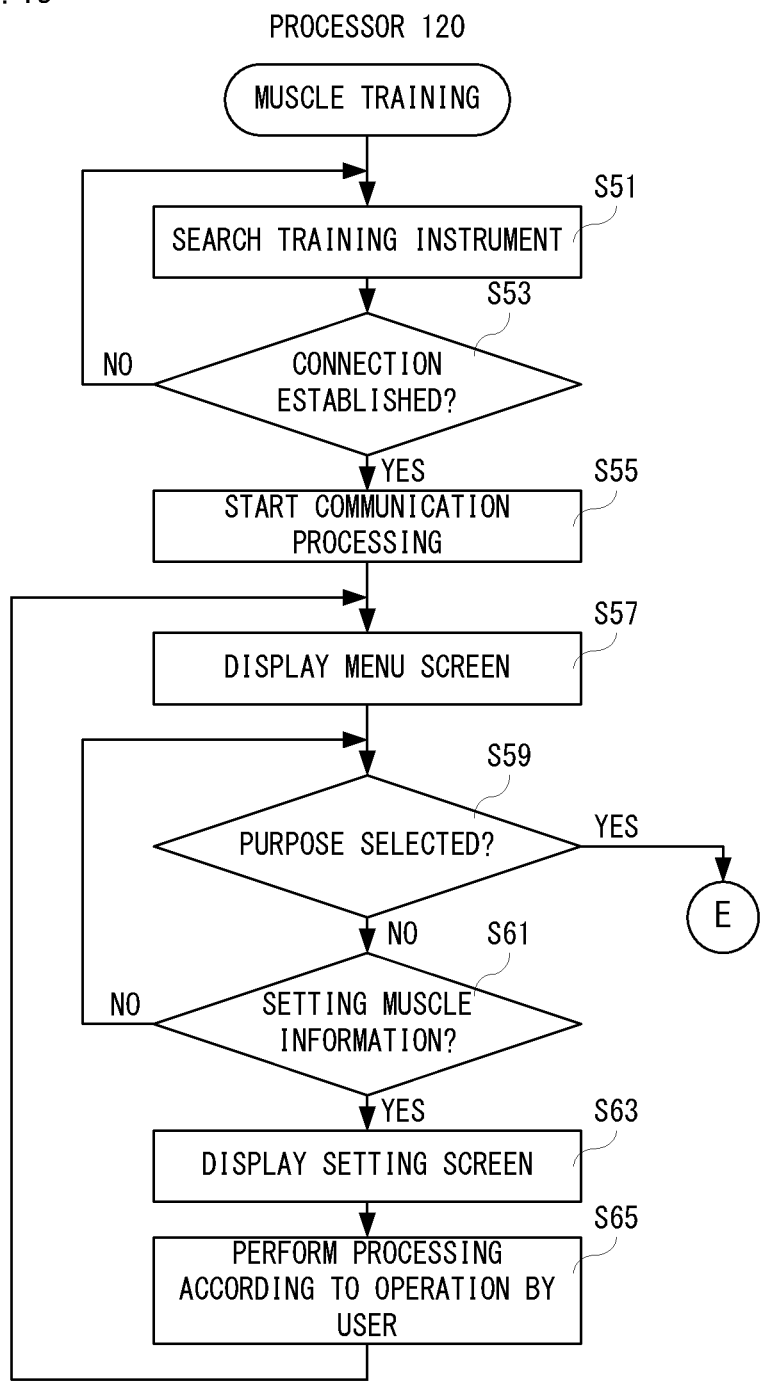
FIG. 15 is a flowchart showing a part of non-limiting example muscle training processing of the processor incorporated in the portable terminal shown in FIG. 4.
Figure 16:
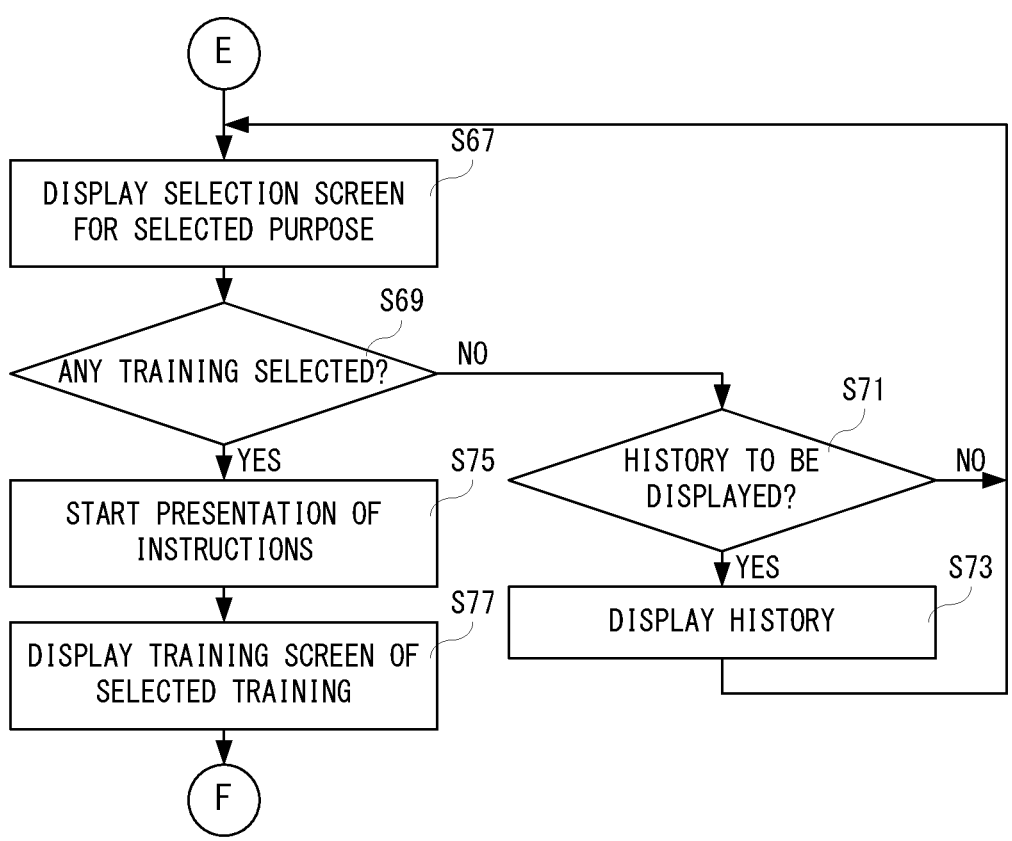
FIG. 16 is a flowchart showing another part of the non-limiting example muscle training processing of the processor incorporated in the portable terminal shown in FIG. 4, following FIG. 15.
Figure 17:
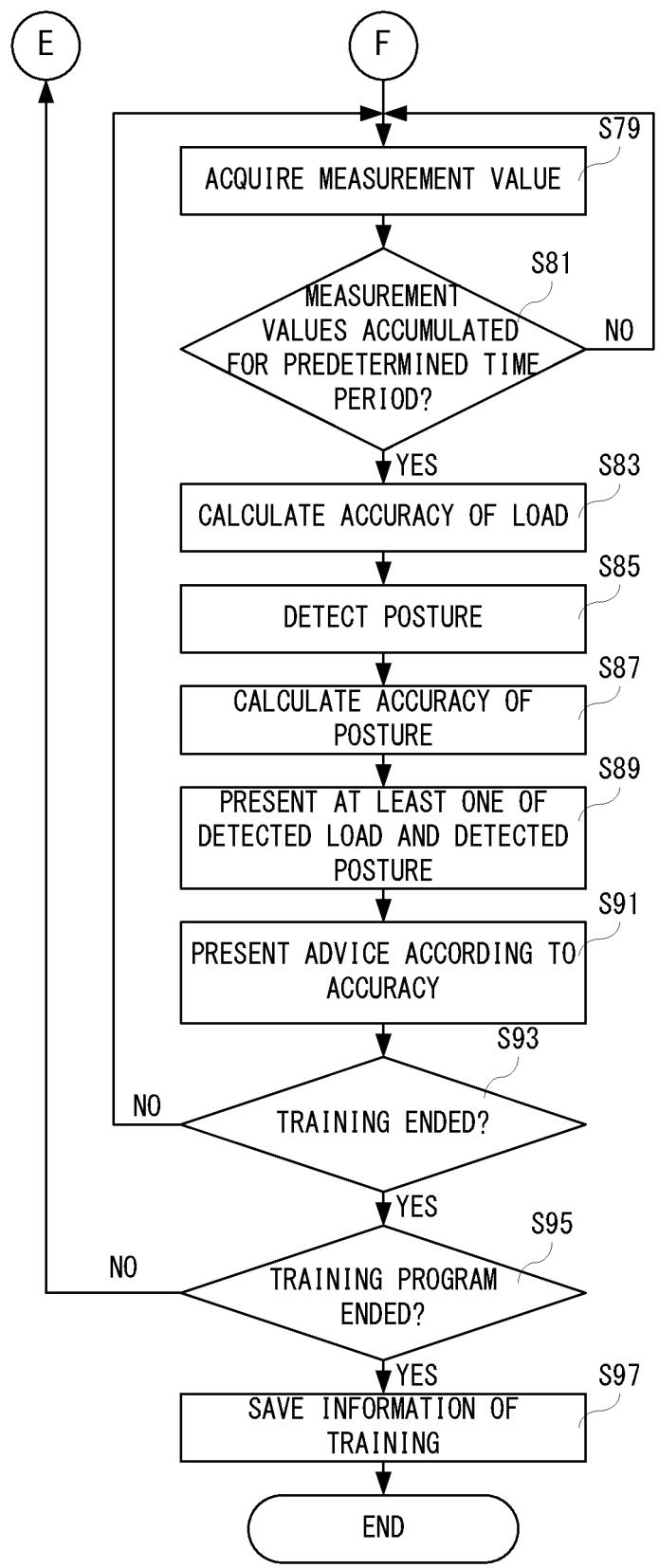
FIG. 17 is a flowchart showing the other part of the non-limiting example muscle training processing of the processor incorporated in the portable terminal shown in FIG. 4, following FIG. 16.

FIG. 15-FIG. 17 are flow charts of muscle training processing of the processor 120 of the portable terminal 110 shown in FIG. 4. In addition, it is pointed-out in advance that processing in respective steps in the flow charts shown in FIG. 15-FIG. 17 are mere examples, and if the same result is obtained, an order of the respective steps may be changed. Moreover, in this embodiment, it is assumed that the processor 120 executes the processing of each step of the flowcharts shown in FIG. 15-FIG. 17; however, some steps may be executed by a processor(s) other than the processor 120 or a dedicated circuit(s).

If the user operates the portable terminal 110 to start the training program 702*f*, the processor 120 starts the muscle training processing, and search, in a step S1, the training instrument 10. In a next step S53, it is determined whether connection with the training instrument 10 is established.

If "NO" is determined in the step S53, that is, if connection with the training instrument 10 is not be established, the process returns to the step S51. On the other hand, if "YES" is determined in the step S53, that is, if connection with the training instrument 10 is established, communication processing is started in a step S55. That is, although illustration is omitted, in parallel to processing of a training program, the processor 120 performs communication processing and receives the transmission data transmitted from the training instrument 10 so as to additionally store as the measurement data 704*e* in the data storage area 704 in a time series.

In a next step S57, the menu screen 200 as shown in FIG. 5(A) is displayed on the display 148. Subsequently, it is determined, in a step S59, whether a purpose of training is selected. Here, the processor 120 determines whether any of the icons 202-208 is touched. However, the processor 120 determines that the icon (202, 204, 206 and 208) displayed on a position that touch coordinate data from the touch panel 144 indicates. In the following, this is true for a case where other icons and display areas is touched.

If "YES" is determined in the step S59, that is, if the purpose of training is selected, the process proceeds to a step S71 shown in FIG. 16. On the other hand, if "NO" is determined in the step S59, that is, if a purpose of training is not selected, it is determined, in a step S61, whether it is a setup of muscle power information. Here, the processor 120 determines whether in the icon 212 is touched.

If "NO" is determined in the step S61, that is, if it is not a setup of muscle power information, the process returns to the step S59. In processing of this training program, since it is premised on connection with the training instrument 10 having been established, illustration is omitted, but when touching the icon 210 in the menu screen 200, the connection processing with the training instrument 10 is performed. For example, the icons 202-208 are displayed in an untouchable state prior to connection processing with the training instrument 10 is established, and if connection with the training instrument 10 is established, the icons 202-208 are changed into a touchable state.

On the other hand, if "YES" is determined in the step S61, that is, if it is a setup of muscle power information, after displaying the setting screen 250 as shown in FIG. 5(B) on the display 148 in a step S63 and performing setting processing in a step S65 according to an operation of the user, the process returns to the step S57. Although detailed description is omitted, as described above, a maximum load of a part to be set is registered (set or changed) in the step S65. The muscle power information that is set here is stored (updated) as the setting data 704*b* in the data storage area 704.

If a purpose of training is selected in the menu screen 200 as described above, as shown in FIG. 16, the selection screen 300 as shown in FIG. 6(A) about the selected purpose on the display 148 in the step S67. In a next step S69, it is determined whether there is any selection of training. Here, the processor 120 determines whether any of the icons 302-306 is touched in the selection screen 300.

If "NO" is determined in the step S69, that is, if there is no selection of training, it is determined, in the step S71, whether a history is to be displayed. Here, the processor 120 determines whether the icon 308 is touched. If "NO" is determined in the step S71, that is, if it is not display of history, the process directly returns to the step S67. On the other hand, if "YES" is determined in the step S71, that is, if it is the display of history, after displaying a history corresponding to the history data 704*f* on the display 148 in a step S73, the process returns to the step S67. However, in fact, if there is an instruction from the user, the display of history is ended, and the process returns to the step S67.

Moreover, if "YES" is determined in the step S69, that is, if there is selection of individual training, presentation of instruction content about the selected individual training is started in a step S75. Subsequently, the training screen (300, 350, 400, 450, 500, etc.) as shown in FIG. 6-FIG. 8 about the selected individual training on the display 148 in a step S77, and the process proceeds to a step S79 shown in FIG. 17. Here, as described above, in the training screen, an animation about how to perform the individual training is displayed, and the instruction about the individual training is output from the speaker 152 with a voice. Moreover, as described above, the load and the number of times both included in the instruction are automatically determined by the training program 702*f*. Therefore, according to the presented instruction, the user holds the training instrument 10 and performs a predetermined motion or maintains a predetermined posture while applying the load to the training instrument 10 being held. However, depending on a kind of training, like the squat beginner class, the user merely holds the training instrument 10 and may not apply the load. In addition, although detailed description is omitted, steps S75-S93 are performed about the individual training that is selected in the selection screen 300. Therefore, in fact, there is provided with processing (program) for each individual training.

As shown in FIG. 17, in the step S79, a measurement value is acquired. Here, the processor 120 acquires the transmission data 604*e* that is transmitted from the training instrument 10 and received by the antenna 134 and the first wireless communication circuit 132 so as to additionally stores as the measurement data 704*e*. In a next step S81, it is determined whether the measurement value is accumulated for a predetermined time period (0.5 seconds, for example). However, since the processor 120 performs processing with using the measurement values for each predetermined time period, this predetermined time period means a time period after performing the processing using the measurement values at a previous time.

If "NO" is determined in the step S81, that is, if the measurement value is not accumulated for the predetermined time period, the process returns to the step S79. On the other hand, if "YES" is determined in the step S81, that is, if the measurement value is accumulated for the predetermined time period, accuracy of load is calculated in a step S83. In this embodiment, the processor 120 determines whether the load exceeds the presented load, and when the load is less than the presented load, calculates a difference therebetween.

In a subsequent step S85, a posture of the user is detected from at least one of the acceleration and the angular velocity that are indicated by the measurement data 704*e*. If saying strictly, the processor 120 detects angles of a predetermined part of the user with respect to a horizontal direction and a vertical direction from the acceleration and the angular velocity.

Then, in a step S87, accuracy of the posture is calculated. Here, the processor 120 calculates a degree of coincidence between the posture of the user that is detected in the step S85 and a correct posture that is set in advance in the training program 702*f*.

In a subsequent step S89, the user is presented with at least one of the detected load and the detected posture. As described above, here, the processor 120 performs processing that displays a numeral value of the load that the user currently applies to the training instrument 10 and the detected current posture (angle of the part to be paid attention) of the user, performs processing that displays the accuracy of the posture, and performs processing that displays temporal duration and the number of times of motion.

Subsequently, advice according to the accuracy is presented in a step S91. As described above, here, the processor 120 performs processing that displays the current posture of the user with using an avatar, and performs processing that outputs with a voice advice to strengthen or weaken the load and advice to increase or decrease a bending angle of a joint.

Then, it is determined, in a step S93, whether it is an end of training Here, the processor 120 determines whether the user performs the selected training to the last, or whether an instruction to end the training is given by the user. If "NO" is determined in the step S93, that is, if it is not the end of training, the process returns to the step S79. On the other hand, if "YES" is determined in the step S93, that is, if it is the end of training, it is determined, in a step S95, whether it is an end of the training program 702*f*. Here, it is determined whether the end of the training program 702*f* is instructed by the user. If "NO" is determined in the step S95, that is, if it is not the end of the training program 702*f*, the process returns to the step S67 shown in FIG. 16. That is, the display returns to the selection screen 300 of individual training according to the selected purpose. However, the process may be returned to the step S57 (menu screen 200). On the other hand, if "YES" is determined in the step S95, that is, if it is the end of the training program 702*f*, information on the training at this time is saved in a step S97, and the muscle training processing is terminated. That is, in the step S97, the processor 120 saves the date and time (time) of the training, the content of training, the load and the posture (including acceleration and angular velocity) that are detected from the transmission data 604e (measurement data 704e) received from the training instrument 10 during the muscle training processing, and the data about the accuracy of the posture when performing the training concerned in the HDD 130, as history data, or add these to the history data having been saved in the HDD 130. However, the information on the training may be saved in the HDD 130 at an arbitrary timing according to an instruction of the user.

According to this embodiment, there are provided with the load sensor, the acceleration sensor and the gyro sensor in the training instrument capable of being held by both hands, and the load applied to the training instrument is detected and the posture and the motion of the training instrument are detected, and therefore, in performing the training, there is no constraint on the posture and the motion of the user due to a problem of a configuration of the training instrument. Therefore, it is possible to make various kinds of training performable. That is, it is possible to expand the range of training.

Moreover, according to this embodiment, a general-purpose portable terminal such as a smartphone can be used.

Furthermore, according to this embodiment, it is sufficient to prepare a portable terminal such as a smartphone in addition to the training instrument, and therefore, it is not necessary to provide a dedicated system. Moreover, since the portable terminal has no choice of an installation place under a situation capable of performing a communication with a base station, a place of training is not restricted.

In addition, although there are provided with the acceleration sensor and the gyro sensor in order to detect at least one of the tilt (posture) and motion of the main body of the training instrument in this embodiment, even if providing only either, at least one of the tilt (posture) and motion of the main body can be detected.

Moreover, although the measurement value for the predetermined time period is accumulated on a side of the portable terminal in this embodiment, the measurement value for the predetermined time period may be accumulated on a side of the training instrument, and be transmitted to the portable terminal.

Furthermore, although the load is corrected on a side of the training instrument in this embodiment, the load may be corrected on a side of the portable terminal. In such a case, the correction value is transmitted to the portable terminal from the training instrument, and stored in the portable terminal. Moreover, the data of the detected temperature is also transmitted to the portable terminal, in this case.

Furthermore, since the current load and the accuracy of the posture are presented to the user during the training, the current load, the posture and the accuracy of the posture are calculated in the portable terminal; however, when presenting to the user a change of the load and a change of the accuracy of the posture after ending of the training, the load, the posture and the accuracy of the posture may be calculated by a further computer different from the portable terminal. The further computer corresponds to a server 1002 (see FIG. 18) described later. In this case, at least the load data, the acceleration data and the angular velocity data that are detected during the training are transmitted from the portable terminal to the further computer (server 1002).

Moreover, although the current load, the accuracy of the posture, etc. are presented to the user during the training in this embodiment by performing at least one of a screen display and a voice output in the portable terminal 110, it does not need to be limited to this. For example, by determining the load and the accuracy of the posture by the processor 30 of the training instrument, the load and that the posture is correct or incorrect may be notified (presented) by means of at least one of the blinking of the LED lamp 20, the sounding of the buzzer 44 and the driving of the vibration motor 52. Therefore, the training instrument 10 may be configured to provide with any one of the LED lamp 20, the buzzer 44 and the vibrating motor 52. However, the load and the accuracy of the posture may be determined by the processor 120 of the portable terminal 110, and a determining result may be transmitted to a side of the training instrument 10.

Furthermore, the training instrument shown in this embodiment is a mere example, and should not be limited. For example, it may be provided with a speaker in the training instrument. Specifically, a D/A converter is mounted on a control board incorporated in the main body of the training instrument in a manner capable of performing communication with the processor, and the speaker is connected to this D/A converter. In this case, the buzzer may be omitted. The speaker is operated to exert the same function as the buzzer described in the above embodiment. Moreover, when providing a speaker in the training instrument, a sound or voice (music) that is output from the speaker provided in the portable terminal may be output from the speaker provided in the training instrument instead of the speaker provided in the portable terminal or along with the speaker provided in the portable terminal. In such a case, sound data corresponding to the sound or voice that is output from the speaker is transmitted to the training instrument from the portable terminal.

Furthermore, although the history data is stored in the portable terminal in this embodiment, such information may be managed by a further computer different from the portable terminal. For example, a server that provides a predetermined service may manage the history data. An example of a system using such a server will be described.

Figure 18:
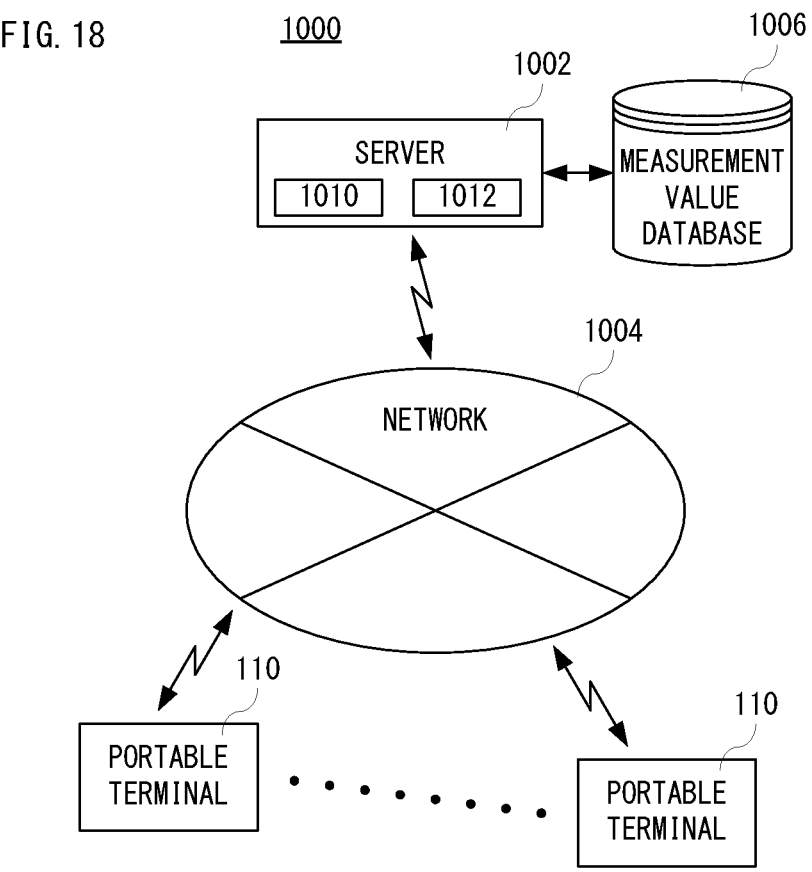
FIG. 18 is an illustration view showing non-limiting example network system using the portable terminal shown in FIG. 2 and FIG. 3.

A network system 1000 shown in FIG. 18 includes a server 1002. This server 1002 is a general-purpose server, and comprises a CPU 1010 and a memory 1012. The memory 1012 includes an HDD, ROM and RAM. Although illustration is omitted, the server 1002 is provided with further circuit components such as a communication module, etc.

Through a network 1004 like the Internet, the server 1002 is connected with two or more portable terminals 110 communicably. Moreover, a database (measurement value DB) 1006 is directly connected to the server 1002. Although the measurement value DB 1006 is provided outside the server 1002 in the example shown in FIG. 18, it may be provided inside the server 1002. Moreover, the server 1002 and the measurement value DB 1006 may be connected communicably through the network 1004.

Figure 19:
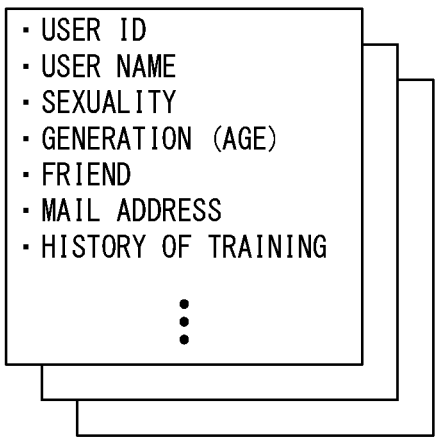
FIG. 19 is an illustration view showing non-limiting example management information stored in a measurement value database shown in FIG. 18.

Moreover, the server 1002 manages the measurement value for each user using the measurement value DB 1006. For example, as shown in FIG. 19, information to be managed (management information) includes a user ID, a user name, sexuality, generation (age), a friend, a mail address, a training history, etc.

Although detailed description is omitted, the user accesses using the portable terminal 110, for example a site that is operated by the server 1002, thereby to register the user information, i.e., the user name, the sexuality, the age and the mail address. Moreover, the user registers his/her friend user (a user name or user ID) if needed. Then, after the user performs training, according to an operation of the user, or automatically, the portable terminal 110 transmits data (result data) about a result of the training at this time to the server 1002. It should be noted that the result data is data about the training result that includes the date and time (time) of the training, a content of the training, a load (load value) and posture (also including acceleration and angular velocity) detected during the training and the accuracy of the posture when performing the training. The server 1002 receives the result data, and updates the training history (history data) in the measurement value DB 1006 corresponding to the user (user ID).

The user ID is unique identification information for identifying a user, and in order to manage the above-described information for each user by the server 1002, for example, it is given to the user or the portable terminal 110 that the user concerned uses.

The user name is a name or nickname etc. of the user. The sexuality is distinction of a man or a woman. The friend is a user name or a user ID of a further user who is registered by the user as a friend. However, a person capable of being registered as a friend is limited to a user who utilizes this site. Moreover, friends need not be restricted to real-world friends in a strict sense, but may be family members or company colleagues.

Although a mail address is basically a mail address that is set in the portable terminal 110 that the user uses, may be a mail address that is set in a further terminal that the user concerned uses. Since the history of training is the content of the above-described history data, duplicate description is omitted here.

For example, the server 1002 can provide a service in accordance with the result of training (result data), which includes distributing an additional application capable of performing further training, distributing purchase benefit of other applications, giving points (virtual coins) that can be used for purchasing applications, or distributing an avatar, an avatar item, etc. Hereinafter, the application, the purchase benefit, the virtual coins and the avatar and avatar item that the server 1002 distributes are collectively called "contents". If doing this way, it is thought that motivation for the user to perform the training or the user to continuously perform the training can be enhanced.

However, what is distributed or given to the user does not need to be limited to digital contents. For example, goods (analog contents) such as tools or instruments, books, DVDs, food, etc. about training, diet or health may be distributed. In such a case, an address, a telephone number, etc. of the user, for example are also managed as the user information.

For example, the server 1002 determines, using reward information (gift information) as shown in FIG. 20, whether a reward (digital or analog contents) is to be distributed, and determines a reward to distribute. Table data of reward information as shown in FIG. 20 is stored in the memory 1012, and the CPU 1010 performs, with reference to this table data, reward determination processing (see FIG. 21) described later.

As shown in FIG. 20, rewards are described in the reward information corresponding to distribution conditions. The distribution condition includes a kind of training, a level (menu) of training, a score (evaluation) of training and the number of continuing days. However, all of the level of training, the score of training and the number of continuing days do not need to be imposed as the distribution condition, and any one or two combination may be sufficient. In FIG. 20, items that are not imposed as distribution conditions are indicated by drawing cross bars.

The above-described type (identification information) of training is described in a column of the type of training. In a column of the level (menu) of training, numeral values (1, 2 - - - ) of levels and menu information (beginner class, middle class, upper class, etc.) are described. A range (standard value) of the score (evaluation) is described in a column of the score (evaluation) of training. A standard value of days (duration) is described in a column of the number of continuing days. In a column of the reward, there are described kinds (identification information) of the analog or digital contents to be distributed when satisfying the corresponding condition of distribution to the user or the portable terminal 110 that the user concerned owns.

For example, in a case where the training that the user performs this time is isometric, the level thereof is 1 and the score is less than 80 points, distributing a reward A is determined. Moreover, for example, in a case where the training that the user performs at this time is isometric and the number of continuing days is one week, distributing a reward E is determined. Descriptions are omitted, but the same applies to other cases.

When distributing a reward is determined, if a reward is digital data, the server 1002 sets the data concerned in a downloadable manner to the user (user ID) who gains the reward, and notifies to the portable terminal 110 that the user concerned owns by email that the user gains the reward and that the user can download the reward, and so on. When a reward is goods, a manager of the server 1002 etc. arranges for sending the goods to the user who gains the reward, and notifies to the portable terminal 110 that the user concerned owns by an email that the user gains the reward and that the reward is sent to the user, and so on.

In addition, the reward information (distribution condition) shown in FIG. 20 is a mere example, and should not be limited. For example, even when the distribution condition does not include the number of continuing days, it may be determined whether a reward is to be distributed based on not only the result of this training but the result of the past training, i.e., the training history.

Moreover, in consideration of not only the distribution condition but the user information, it may be determined whether a reward is to be distributed, and a reward to be distributed. In such a case, as the user information, not only the age and sexuality but also presence or absence of exercise experience, nationality, residential area, etc. may be taken into consideration. In addition, the presence or absence of exercise experience, the nationality, the residential area, etc. are included in the management information.

Figure 21:
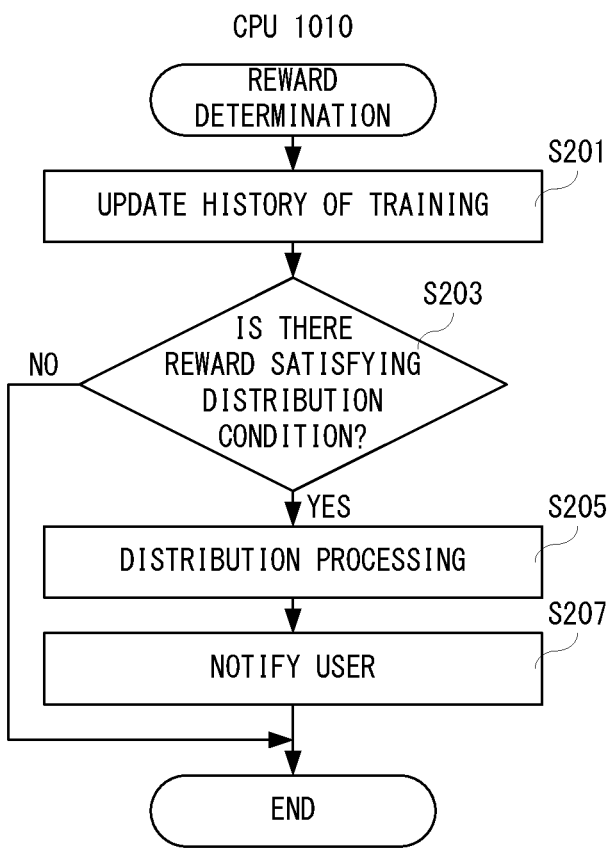
FIG. 21 is a flowchart showing non-limiting example reward determination processing of a CPU of the server shown in FIG. 18.

Specifically, the CPU 1010 of the server 1002 performs reward determination processing shown in FIG. 21. It should be noted that the reward determination processing is performed for each portable terminal 110 by which the result data is transmitted. Therefore, if the server 1002 receives the result data from the portable terminal 110, as shown in FIG. 21, the CPU 1010 starts the reward determination processing for the portable terminal 110 concerned.

First, in a step S201, the training history of training corresponding to the user ID concerned is updated by the received result data. In a next step S203, it is determined whether there is any reward that satisfies a distribution condition through reception of a result of training. Here, the CPU 1010 determines, with reference to the reward information, whether there is any reward that satisfies a distribution condition.

If "NO" is determined in the step S203, that is, if there is no reward satisfying a distribution condition, the reward determination processing is ended. On the other hand, if "YES" is determined in the step S203, that is, if there is a reward satisfying a distribution condition, reward distribution processing is performed in a step S205. Here, the CPU 1010 sets so that the portable terminal 110 (user) having transmitted the result data can download digital data as a reward, or sends an email addressing a terminal of a person in charge that notifies to the user of the portable terminal 110 having transmitted the result data arrangement of delivery of a reward goods.

Then, it is notified to the user in a step S207 that a reward is distributed, and then, the reward determination processing is ended. For example, in the step S207, the CPU 1010 sends an email to the portable terminal 110 having transmitted the result data, which notifies that the digital data of the reward becomes downloadable, or that arrangement for delivering the reward goods is performed.

Moreover, the server 1002 can also provide various services for a user with using the training history.

For example, the server 1002 can provide various kinds of services, such as presenting a training history in graph form or the like (spreadsheet), presenting an absolute evaluation (change in the maximum load for each part) based on the result of training, introducing recommended training, introducing training books, diet books, etc., and so on.

Moreover, the server 1002 can provide services, such as presenting the average value of the calculated maximum load, the extracted maximum value, the extracted minimum value, etc. for each category of sexuality, age, etc., presenting a comparison result of the training history compared with a further user that has a profile similar to the user and/or a further user that the user registers as a friend, and presenting a ranking. For example, a comparison result about the accuracy of the posture or training progress is presented. Moreover, the server 1002 can also provide such a service that advises on the training progress of the user based on at least one of the training history of the user and the comparison result of the training history with those of the further user. Furthermore, the server 1002 can also provide a service that notifies to the user a further user who is performing training at the same time as the user among other users having been registered as a friend. By providing such a service, for example, it is thought that competitive spirit of the user can be encouraged and motivation to continue training can be enhanced.

Thus, information related to a further user or a training history of the further user is presented to the user, such as presenting the average value of the calculated maximum load value, the extracted maximum value, the extracted minimum value, etc. for each category, presenting a comparison result of the training history with those of the further user, presenting a ranking.

In addition, although the comparison result of the training history and the comparison result of training progress are presented to the user, training histories and training progress of the user and the further user may be presented without comparing. In such a case, the user compares own training history (result) with the training history (result) of the further user, or compares own training progress with training progress of the further user. In such a case, about the training history (result) and the training progress, it is not necessary to simultaneously present those of the user and those of the further user, and may be switchedly presented according to an operation of the user. Moreover, even in such a case, it is possible to present the training history and the training progress for a further user with some relevance such as having a profile similar to the user (further user associated with the user).

Moreover, the user may be presented with own training history, while for the further user, only the training result of the previous training may be presented.

Thus, there are various methods of presenting various information, such as the training history (result), the training progress, a comparison result about these with the further user, and should not be limited to the example described above.

Furthermore, the server 1002 can also provide a service that sends a message prompting to perform the training to the user who is not training more than a predetermined period (three days, for example) or more based on the training history.

Moreover, the server 1002 may manage management information on a group basis. A group in such a case is classified on company basis, for example. Therefore, in a company, for example, an employer distributes the training instrument 10 and the training program 702f to each employee. The server 1002 or its operator provides a service that presents to the employer and the employees a training situation for each employee. If doing this way, the employer can know the training situation of the employee and a health condition of the employee estimated from the training situation thereof. Moreover, the server 1002 can compare the training progress and the training histories of the employees, and advise about a meal to the employees according to health condition, and propose and sell suitable supplement for employees. Moreover, the server 1002 notifies to the employee a name of a further employee who is training at the same time.

In addition, in order to provide such a service, the server 1002 or the administrator or operator of the server 1002 notifies a message or the like to the portable terminal 110 or the like of the user, so that the above-described management information includes mail addresses. Moreover, the above-described various information to be presented are indicated or attached to an email, or indicated on a predetermined page provided in the site, or distributed from the site concerned.

Moreover, although load value data is transmitted to the portable terminal 110 from the training instrument 10 and the result data about the training concerned is transmitted to the server 1002 after the end of training in the above-described example, it does not need to be limited to this. The load value data may be directly or via the network 1004 transmitted from the training instrument 10 to the server 1002 during training. In this case, the server 1002 may calculate the posture of the user and the accuracy of the posture during training, or may calculate a score (evaluation) about training. Moreover, when calculating the posture and the accuracy of the posture during training by the training instrument 10, the result data about training may be transmitted to the server 1002 from the training instrument 10.

Moreover, a shape of the training instrument 10 shown in FIG. 1 is a mere example, and should not be limited. As shown in FIG. 22(A)-22(D) and FIG. 23(A)-23(D), if shapes of the socket portion 18a and the socket portion 18b are changed, shapes of end portions of the main body 12 may be changed so as to receive the changed socket portions 18a and 18b. However, in the training instrument 10 shown in FIG. 22(A)-22(D) and FIG. 23(A)-23(D), the power button 22 and the connector 24 are provided on a side of the socket portion 18b, and the control board 14 is provided on a side of the socket portion 18b.

Figure 22A:
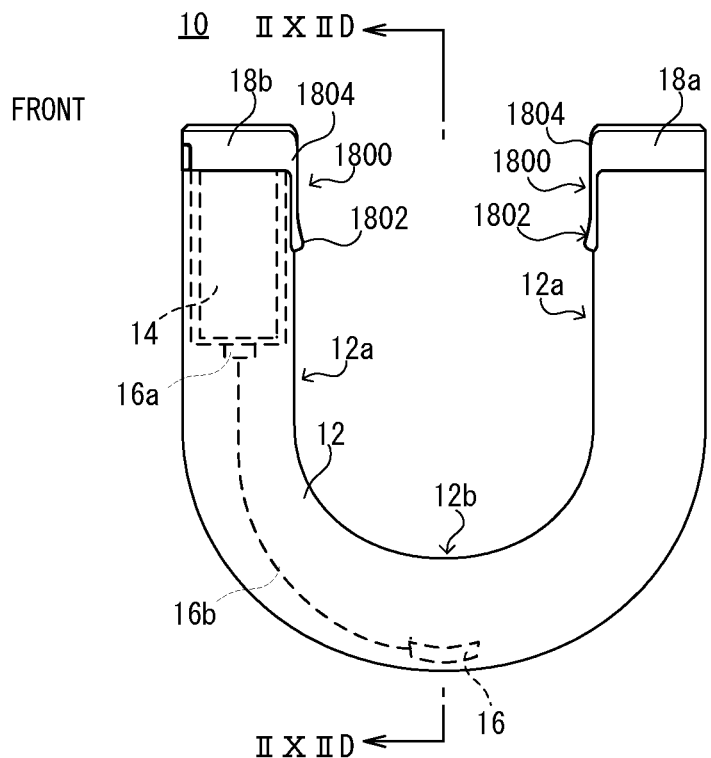
FIG. 22(A) is a front view of the training instrument viewed from the front.
Figure 22B:
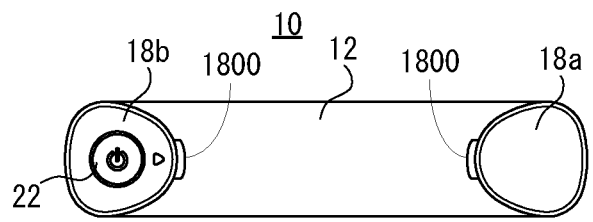
FIG. 22(B) is a top view of the training instrument viewed from the above.
Figure 22C:
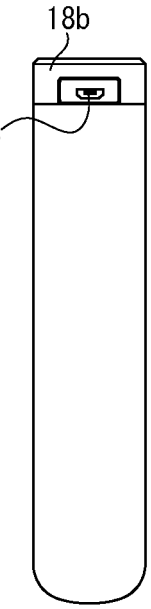
FIG. 22(C) is a side view of the training instrument viewed from a right side.
Figure 22D:
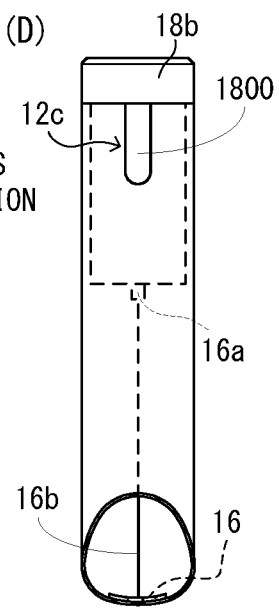
FIG. 22(D) is a cross sectional view at a line IIXIID-IIXIID in FIG. 22(A).

FIG. 22(A) is a front view showing a training instrument 10 of the further example viewed from the front, FIG. 22(B) is a top view of the training instrument 10 of the further example viewed from the above, FIG. 22(C) is a side view of the training instrument 10 of the further example viewed from a right side, and FIG. 22(D) is a cross sectional view at a line IIXIID-IIXIID in FIG. 22(A). In addition, in FIG. 22(D), the control board 14 is omitted.

As shown in FIGS. 22(A) and 22(B), in the training instrument 10 of the further example, convex portions (elongated protrusion) 1800 protruding in directions opposite to each other are formed on the socket portions 18a and 18b. As for the elongated protrusion 1800, a protruding amount is made larger in a part thereof (lower end part in FIG. 22(A)). That is, the elongated protrusion 1800 consists of a first portion 1802 having a larger protruding amount and a second portion 1804 except it. Although illustration is omitted, in the training instrument 10 of the further example, notches 12c capable of each receiving the elongated protrusion 1800 are formed in both end portions of the main body 12.

In addition, in the training instrument 10 of the further example shown in FIGS. 22(A)-22(C), the elongated protrusion 1800 is formed so as to be entirely protruded from the main body 12, but may be formed so that only the first portion 1802 is protruded from the main body 12.

Moreover, as shown in FIG. 22(B), in the training instrument 10 of the further example, the power button 22 and the connector 24 are provided on a side of the socket portion 18b, and although illustration is omitted, the control board 14 is provided inside the socket portion 18b. This control board 14 and the load sensor 16 are electrically connected to each other. Moreover, as shown in FIGS. 22(B) and 22(C), in the training instrument 10 of the further example, the connector 24 is provided in a right-hand side of the socket portion 18b.

For example, when the user uses the training instrument 10 of the further example, the user hangs his/her index finger and/or thumb on the second portion 1804 of the elongated protrusion 1800 and grasps the training instrument 10 of the further example by the both hands so as to sandwich the first portion 1802 with the index finger and the middle finger. However, some users may grasp the further training instrument 10 by the both hands so as to sandwich the first portion 1802 with the middle finger and the third finger. In any case, since the elongated protrusions 1800 (the first portions 1802) are provided, the user can perform training while holding the training instrument 10 of the further example in the same way at every time. That is, the elongated protrusions 1800 (the first portions 1802) function as a positioning member when the user holds the main body 12 (gripping portions 12a). Therefore, the gripping positions do not change every time, whereby occurrence of variations in the measurement of the load can be reduced. Moreover, since the finger is only hung to a portion of the elongated protrusion 1800, no more load than necessary is applied to the socket portions 18a and 18b formed of a resin with weak strength.

Figure 23A:
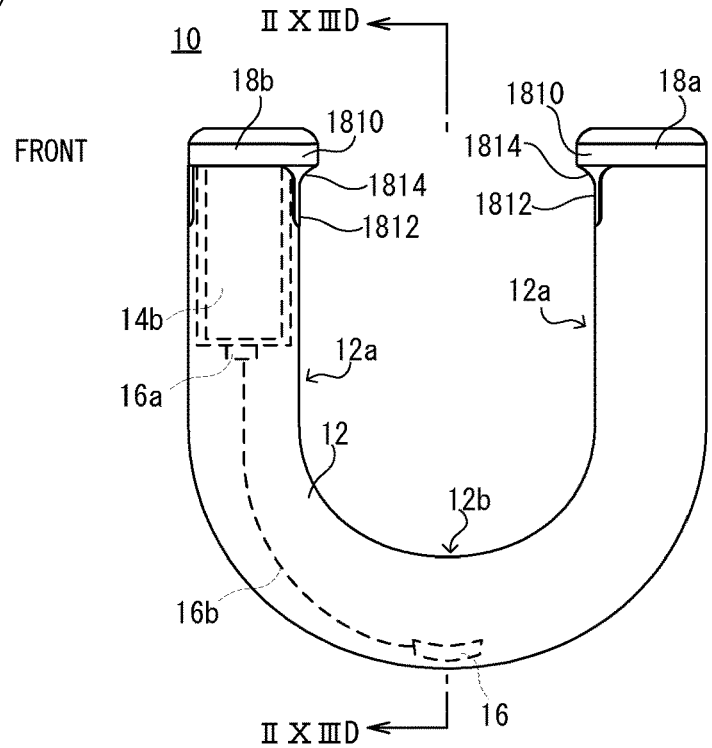
FIG. 23(A) is a front view of the training instrument viewed from the front.
Figure 23B:
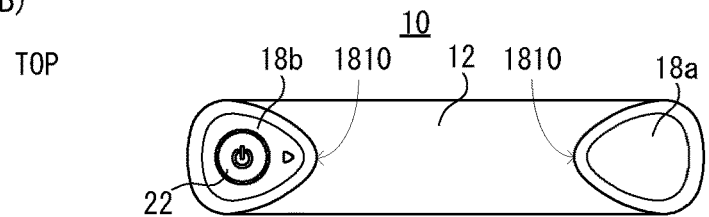
FIG. 23(B) is a top view of the training instrument viewed from the above.
Figure 23C:
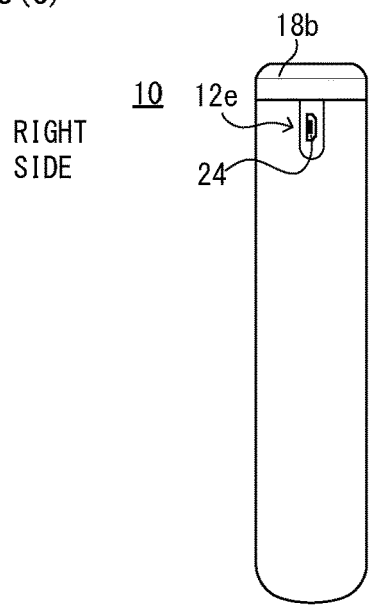
FIG. 23(C) is a side view of the training instrument viewed from a right side.
Figure 23D:
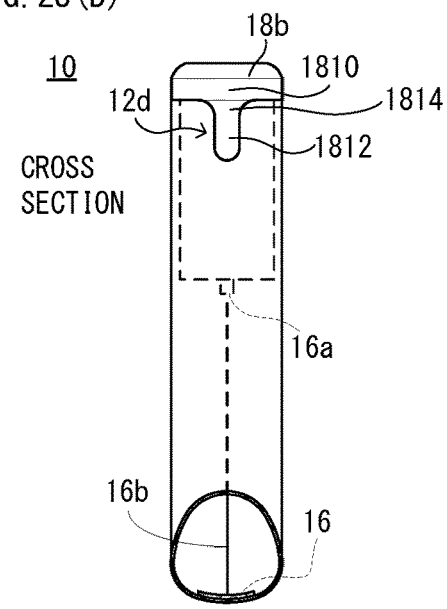
FIG. 23(D) is a cross sectional view at a line IIXIIID-IIXIIID in FIG. 23(A).

A training instrument 10 of a still further example for obtaining such a purpose and effect is shown in FIG. 23(A)-23(D). FIG. 23(A) is a front view of the training instrument 10 of the still further example viewed from the front, FIG. 23(B) is a top view of the training instrument 10 of the still further example viewed from the above, FIG. 23(C) is a side view of the training instrument 10 of the still further example viewed from a right side, and FIG. 23(D) is a cross sectional view at a line IIXIIID-IIXIIID in FIG. 23(A). In addition, in FIG. 23(D), the control board 14 is omitted.

As shown in FIGS. 23(A) and 23(B), in the training instrument 10 of the still further example, convex portions 1810 protruded in directions opposite to each other of the head portions that are not inserted into the main body 12 are formed in the socket portions 18a and 18b. That is, as shown in FIG. 23(B), when the socket portion 18a and the socket portion 18b are viewed from the above, portions of a side corresponding to a vertex of the opposing triangles are brought closer than the training device 10 shown in FIGS. 1(A) and 1(B).

Moreover, as shown also in FIG. 23(D), in the training instrument 10 of the still further example, a notch 12d is formed in a part of the gripping portion 12a. A partial gripping portion 1812 having the same shape as the notch 12d is formed on the socket portion 18b (the same on the socket portion 18a) so as to form a part of the gripping portion 12a. As shown in FIG. 23(A), the convex portion 1810 and the partial gripping portion 1812 are coupled by a connecting portion 1814 having a smooth slope surface. The slope surface of this connecting portion 1814 is formed so that the finger of the user grasping the gripping portion 12a fits exactly.

Furthermore, as seen from FIGS. 23(A)-23(C), in the training instrument 10 of the still further example, the connector 24 is formed on an opposite side of the partial grip portion 1812 with the main body 12 interposed therebetween so as to extend in an attaching direction of the socket portion 18b. Therefore, there is formed with a notch 12e in the main body 12 for providing the connector 24 on a side opposite to the notch 12d. However, the connector 24 may be provided in a position not covering the main body 12 as similar to the training instrument 10 shown in FIG. 1 and the training instrument 10 of the further example shown in FIG. 22(A)-22(D).

Therefore, when using the training instrument 10 of the still further example, the user hangs the index finger or/and the thumb on the partial gripping portion 1812 and the connecting portion 1814, and holds the training instrument 10 of the still further example by the both hands. That is, the connecting portion 1814 that connects the convex portion 1810 and the partial gripping portion 1812 functions as a positioning member when the user holds the main body 12 (gripping portions 12a).

Moreover, although the main body 12 is formed in a U-letter shape in the above-described embodiments, it does not need to be limited to this. Other shapes can be adopted as long as two gripping portions are coupled to each other and the user can hold the gripping portions by the right and left hands and apply a force so as to bring the both hands closer to or away from each other.

Figure 24A:
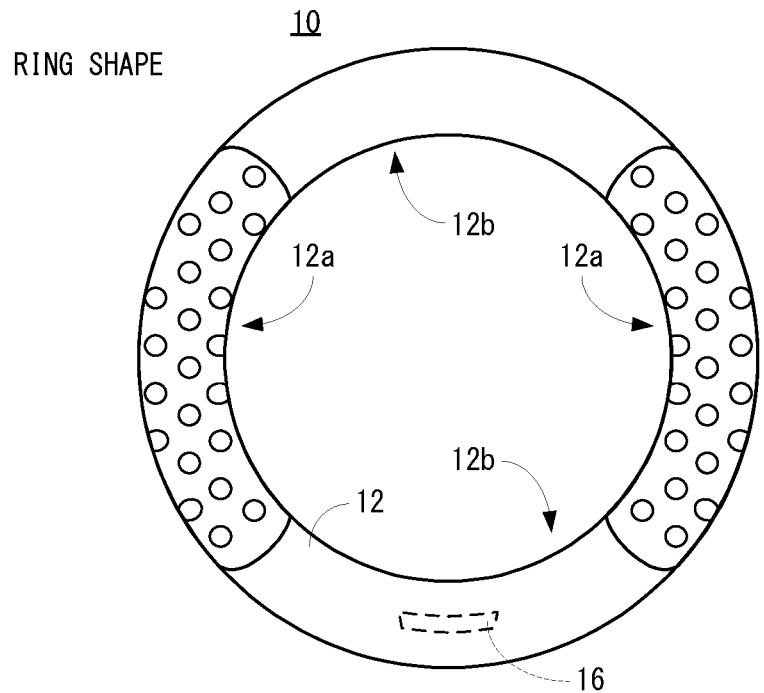
FIG. 24(A) is an illustration view of the training instrument having a main body in a shape of ring.

For example, as shown in FIG. 24(A), as a yet further example of the training instrument 10, the main body 12 may be formed in a ring shape (an O-letter shape, doughnut shape). However, when the main body 12 is formed in a ring shape, a pattern is displayed on the gripping portions 12a in order to make the gripping portions 12a intelligible. However, the gripping portion may be provided with a grip. It is because a load cannot be measured if the user holds a position where the load sensor 16 is affixed. Moreover, in the ring-shaped main body 12, a portion except the gripping portions 12a is the coupling portion 12b.

In addition, a form of a ring may be a form of an ellipse or track-shaped. Moreover, the main body 12 may be formed in a C-letter shape by lacking a part of the ring shape.

Figure 24B:
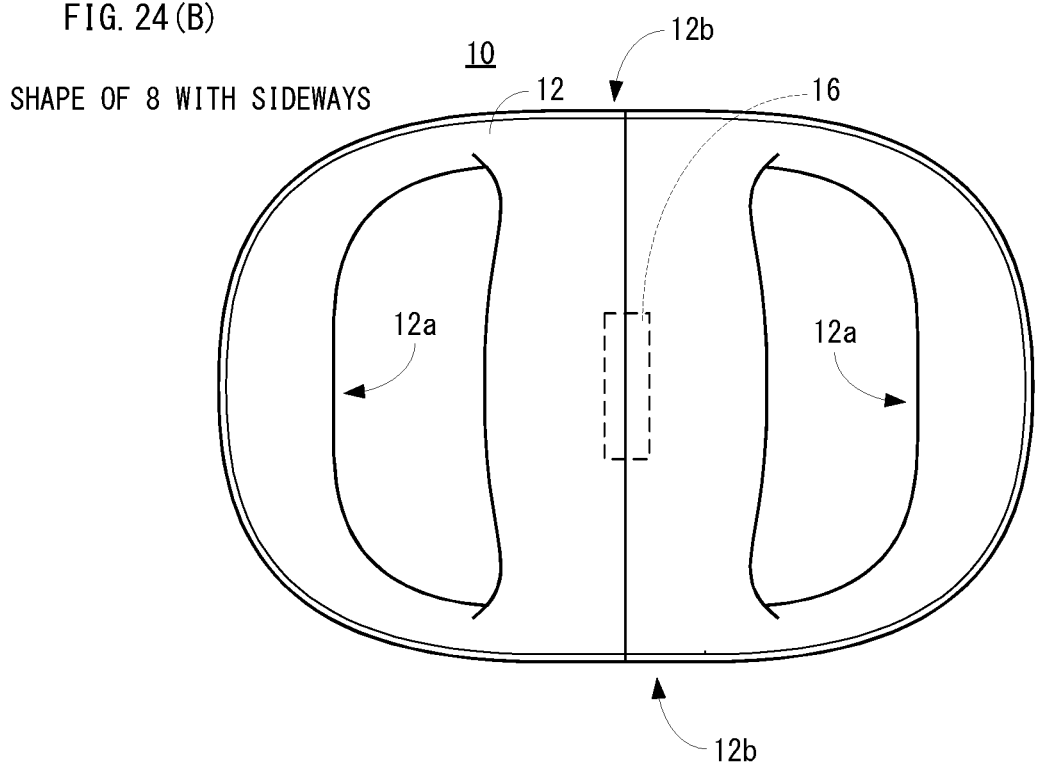
FIG. 24(B) is an illustration view of the training instrument having a main body in a shape of 8-letter with sideways.

Moreover, as shown in FIG. 24(B), it is also possible to form the main body 12 in such a shape that the numeral 8 or the symbol θ (theta) is oriented sideways. In such a case, the load sensor 16 can be arranged in the middle of the two gripping portions 12a. Therefore, a load that user applies can be measured directly. Also in this case, a portion except the two gripping portions 12a of the main body 12 is the coupling portion 12b.

In addition, although illustration is omitted, as other examples, the main body 12 may be formed in an N-letter shape, or may be formed in a shape that an S-letter is oriented sideways.

Moreover, although the control board 14, the power button 22 and the connector 24 are omitted in FIGS. 24(A) and 24(B), the control board 14 can be provided in an arbitrary position inside the main body 12, and the connector 24 is provided near it. The power button 22 is provided in a portion different from the gripping portions 12a.

Moreover, although the training instrument 10 is used for training by detecting the load, and detecting the posture based on the acceleration or angular velocity is explained in the above-described embodiments, the training instrument 10 can be also applied to an input device for a game machine (computer). For example, it is possible to make the above-described portable terminal 110 function as a game machine.

In addition, in this case, the training instrument 10 and the game machine are connected in a manner capable of performing a wireless communication. However, the training instrument 10 and the game machine may be connected by a cable.

Figure 25:
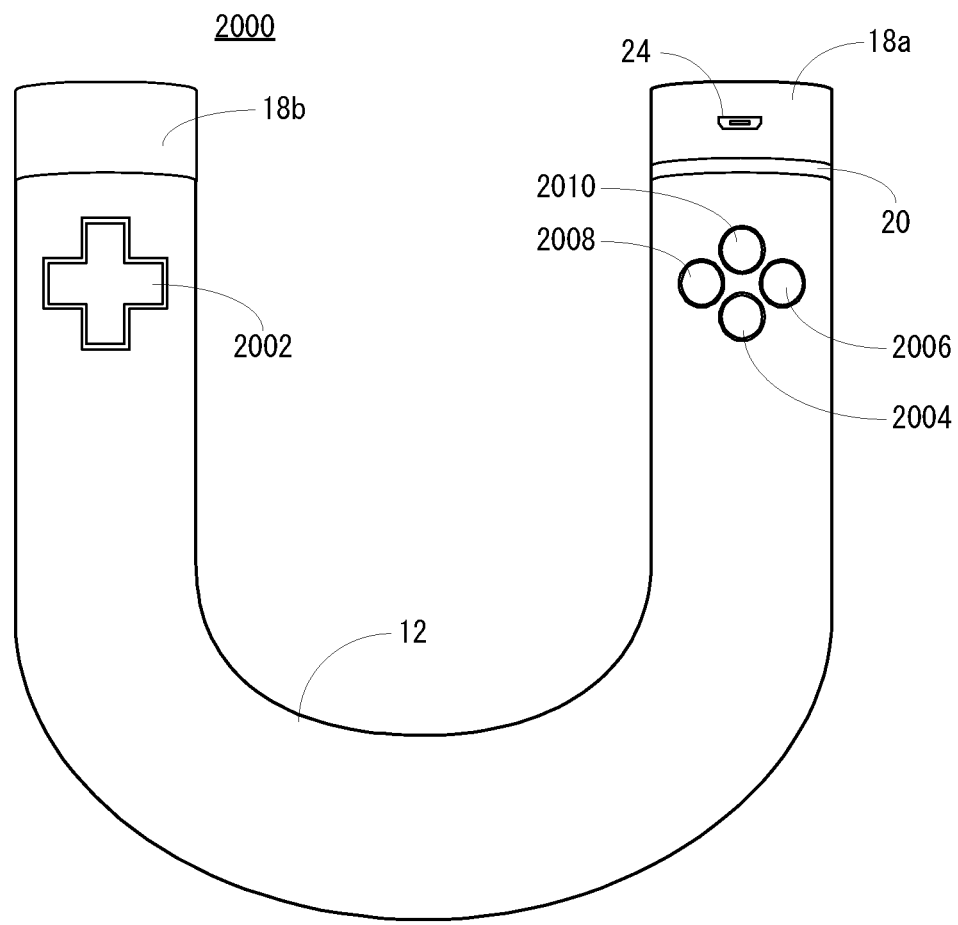
FIG. 25 is an illustration view showing a non-limiting example input device using the training instrument shown in FIG. 1.

In FIG. 25, an example of an input device 2000 that is provided with a cross button 2002 and four push buttons 2004, 2006, 2008 and 2010 on the main body 12 of the training instrument 10 is shown. As for the cross button 2002 and the four push buttons 2004-2010, functions are assigned to respective buttons according to a game played on the game machine, like a usual game controller. For example, when the cross button 2002 is operated, a player object (game character) is moved in a virtual game space. Moreover, when the push buttons 2004, 2006, 2008 and 2010 are operated, arbitrary actions are performed, such that the player object jumps, punches, kicks, grasps (acquires) a non-player object, throws a non-player object, uses a predetermined item, or the like.

However, the cross button 2002 and the four push buttons 2004-2010 do not need to be provided.

Moreover, with the input device 2000 as shown in FIG. 25, since a load, an acceleration and an angular velocity can also be input into the game machine, it is possible to perform the following game processing. For example, a game parameter can be changed according to a changing amount of the load or a magnitude of the load. According to the changing amount of the load, a height that a player object jumps is changed, or a speed that a punch and kick is unleashed is changed. Moreover, according to a magnitude of the load, an offensive strength and defense power of the player object is changed.

Moreover, it is possible to adjust a force or power of the player object by applying a load that is designated by the game to the input device 2000. For example, in a basketball game, when causing the player object to perform a free throw, it is possible to adjust a force to throw a ball.

Moreover, by applying a constant or more load to the input device 2000 continuously, it is possible to hold the player object or the non-player object held by the player object. For example, a screen that displays a predetermined course provided in a virtual space is horizontally scrolled automatically, and in this course, an iron stick object is moved up and down according to a load value measured by the input device 2000 so as not to be brought into contact to a frame that forms the course concerned. For example, when the load value is 0 (zero), the stick object is located in the center (reference position) in the screen. Moreover, the stick object is moved toward a screen upper part, as a force is applied to a direction that the two gripping portions 12a of the input device 2000 are brought close to each other, that is, as the load value to the direction to make approach becomes larger. Inversely, the stick object is moved toward a screen lower part, as a force is applied to a direction that the two gripping portions 12a of the input device 2000 are brought away from each other, that is, as the load value to the direction to separate becomes larger. If the stick object is brought into contact to the frame, it becomes a game over, and if the stick object reaches the goal without touching the frame, the game (course) is cleared.

Moreover, a music game can be also played by applying a load to the input device 2000 in time with a timing instructed by the game. Moreover, by adjusting duration that the load is applied to the input device according to a length of a sound instructed by the game, a score can be calculated by taking into account not only the timing that the load is applied but the duration that the load is applied.

Moreover, a total sum of loads applied to the input device during a predetermined time period can be reflected in the game parameter. For example, according to the total sum of the loads, an offensive strength and defense power of the player object is changed, a level of techniques unleashed by the player object is changed, a kind of techniques unleashed by the player object, or a level of a defense item that the player object uses is changed.

Moreover, it is possible to make the player object perform a repetitive motion by applying a load to the input device 2000 repeatedly. For example, it is possible to cause the player object to swim in underwater of a virtual space, if a load is applied with a predetermined cycle, a speed that the player object swims is made fast. Inversely, when a load is not applied periodically, a speed that the player object swims can be made slow. Moreover, it is possible to cause the player object to perform an iterative motion such as cutting a tree object or a log object in a virtual space. In such a case, it is possible to change a speed of cutting the tree or log object between when a load is periodically applied and when it is not.

Moreover, it is possible to perform game processing using both of the load sensor and the motion sensor (inertial sensor) in such a manner that the player object is caused to perform a first motion with a load applied to the input device 2000 and a second motion different from the first motion with at least one of the acceleration and the angular velocity that are detected according to a movement and tilt (posture) of the input device, or the like. For example, in a shooting game, it is possible to move the player object in a game field based on values of the acceleration and the angular velocity by moving and tilting the input device, and it is possible to cause the player object to shoot a gun by applying a load to the input device, that is, based on a load value. Moreover, for example, in a car racing game, a direction of a car object is changed in a virtual racing field by using an input device like a handle, and by applying a force to the input device, a moving speed of the car object is temporarily changed or a gear is shifted.

Furthermore, although the load sensor 16 is arranged inside a lower most portion of the main body 12 that is formed in a U-letter shape (portion corresponding to a bottom side of the U-letter), that is, a portion that the main body 12 is curved in the above-described embodiments, as described above, the load sensor may be arranged in other positions as long as it is in the coupling portion 12b except the gripping portions 12a.

Figure 26:
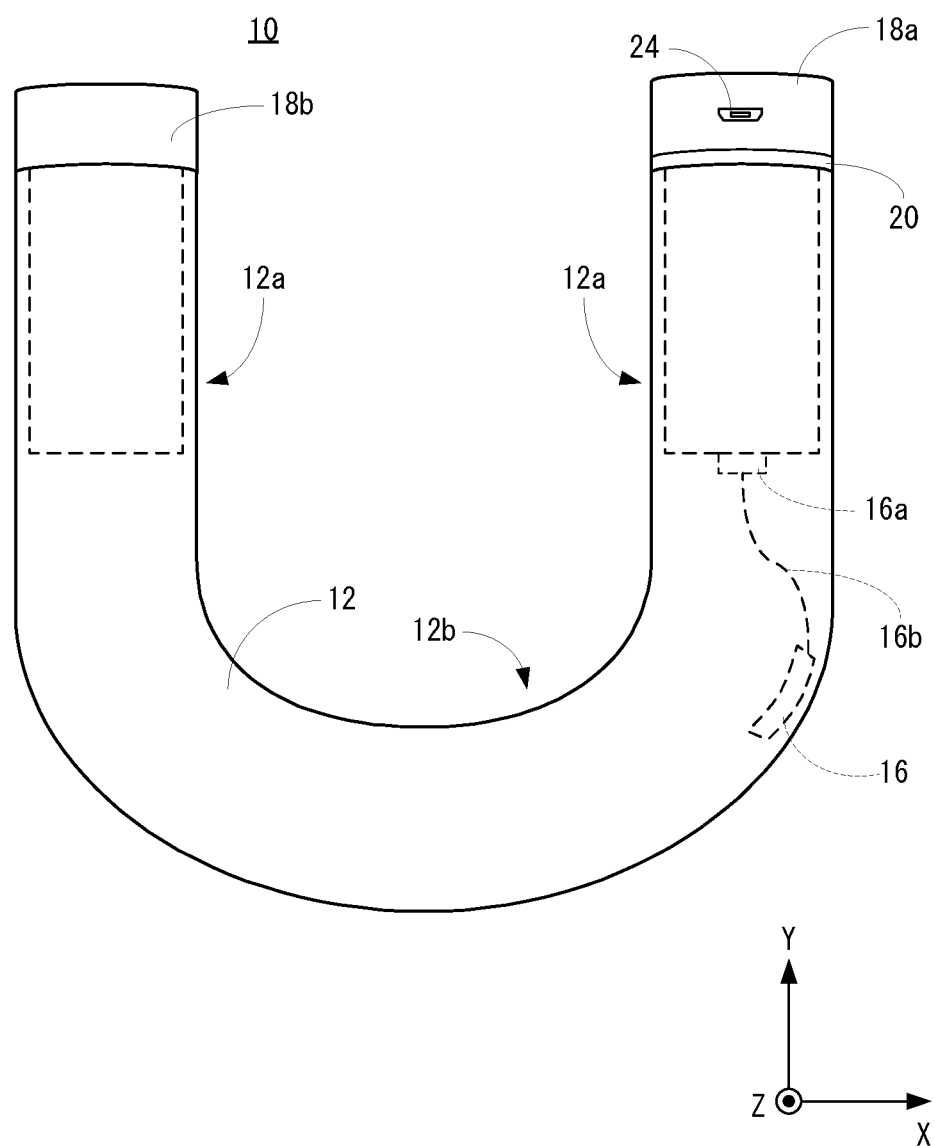
FIG. 26 is an illustration view showing a further non-limiting example training instrument shown in FIG. 1.

For example, as shown in FIG. 26, when viewing the training instrument 10 from the front, the load sensor 16 is arranged inside the coupling portion 12*b* near a position where the gripping portions 12*a* and the coupling portion 12*b* are coupled. Moreover, as shown also in FIG. 26, the load sensor 16 is arranged on a side of the socket portion 18*a* in which the control board 14 is provided in the coupling portion 12*b*.

Moreover, in the above-described embodiments, only describing a case where the training is performed by using the training instrument 10 as it is, but it does not need to be limited to this. For example, variation of training can be increased by providing an assistance member.

Figure 27A:
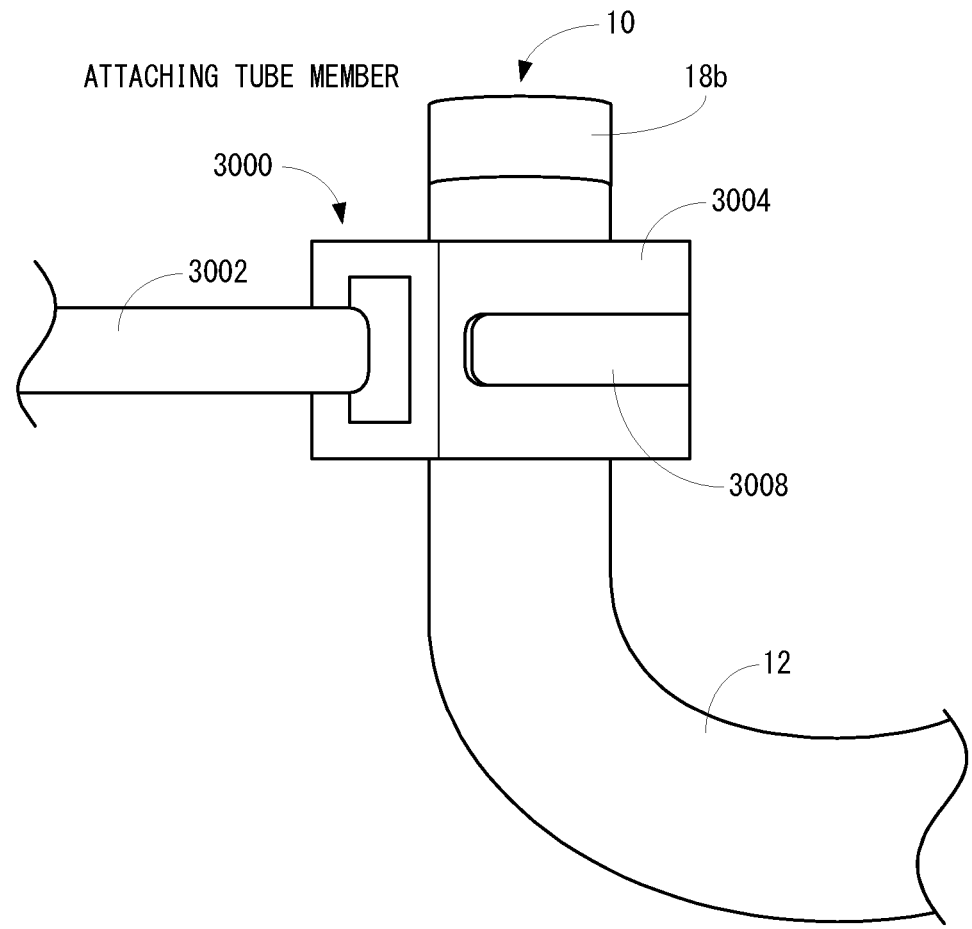
FIG. 27(A) is an illustration view showing a part of state where the training instrument is attached with a tube member and FIG. 27(B) is an illustration view showing of a fixture of the tube member.
Figure 27B:
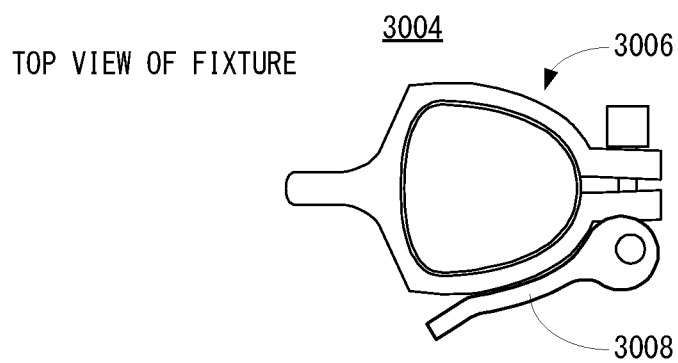

For example, as shown in FIG. 27(A), a tube member 3000 for tube training can be attached to the training instrument 10. As shown in FIG. 27(A), the tube member 3000 includes a rubber tube 3002, and there is provided in an end portion of the rubber tube 3002 with a fixture 3004 for fixing the tube member 3000 to the training instrument 10. As shown in FIG. 27(B), when viewing the fixture 3004 shown in FIG. 27(A) from the above, roughly dividing, the fixture 3004 consists of a ring-shaped main body 3006 and a lever 3008. If the lever 3008 is opened, a diameter of the main body 3006 is made large, and if the lever 3008 is closed, the diameter of the main body 3006 is made small. Therefore, if the main body 3006 is inserted into the main body 12 of the training instrument 10 while opening the lever 3008 is opened, and if closing the lever 3008, the tube member 3000 is fixed to the training instrument 10. Thus, since the tube member 3000 is fixed to the training instrument 10 using the fixture 3004, the tube member 3000 is prevented from being detached during training. However, since the socket portion 18*b* is attachable and detachable, in place with the socket portion 18*b*, a fixing member that is attached to (inserted into) the main body 12 to fix the tube member 3000 may be provided. In addition, the rubber tube 3002 is omitted in FIG. 27(B).

Figure 28A:
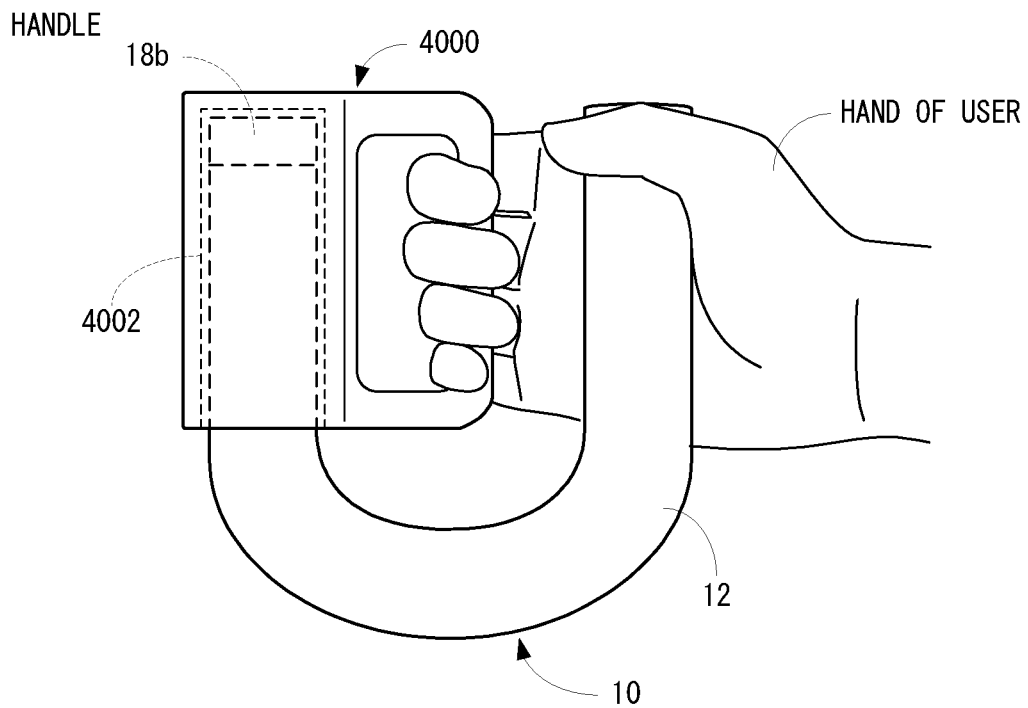
FIG. 28(A) is an illustration view showing a state where the training instrument is attached with a handle and FIG. 28(B) is an illustration view showing a state where the training instrument is attached with another handle.
Figure 28B:
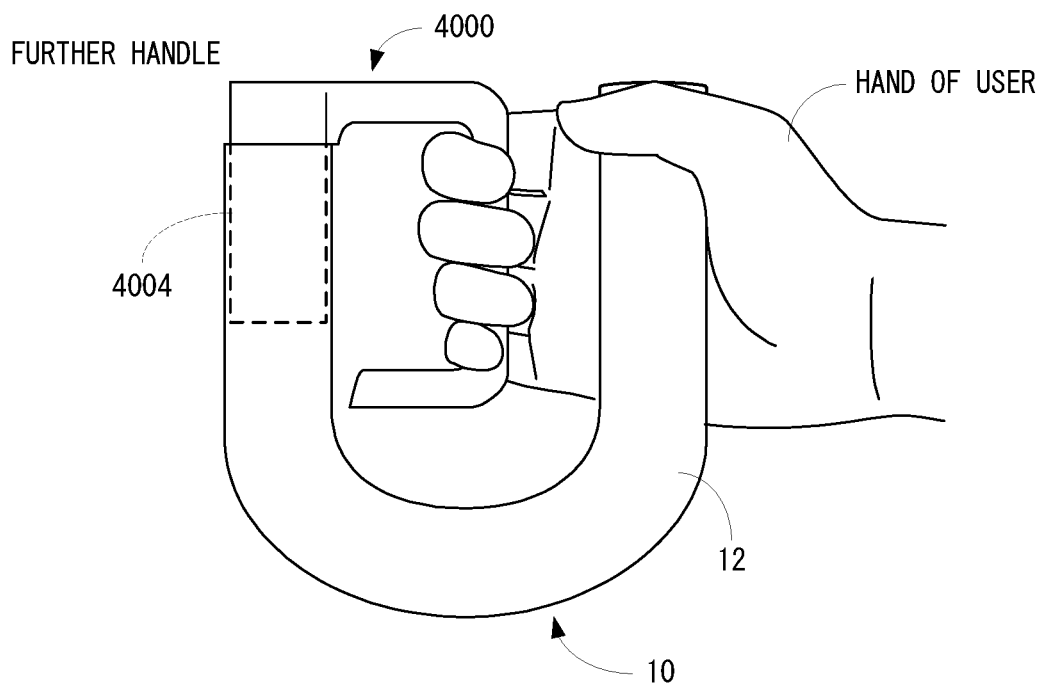

Moreover, as shown in FIG. 28(A) and FIG. 28(B), the main body 12 can also be attached with a further holding portion (handle) 4000 as an assistance member. By thus attaching the handle 4000 to the main body 12, it is possible to apply a force by a single hand in a direction that the two gripping portions 12*a* of the training instrument 10 approach. That is, grip strength can be measured. The handle 4000 shown in FIG. 28(A) is formed with a hole 4002 that receives an end portion of the main body 12 on a side of the socket portion 18*b*, and that end portion is inserted into this hole 4002. Moreover, the handle 4000 shown in FIG. 28(B) is a formed with a projection 4004 to be inserted into the main body 12 in the end portion from which the socket portion 18*b* is detached, and the projection 4004 is inserted into the main body 12 instead of the socket portion 18*b*.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A training instrument, comprising:
a main body comprising first and second grip areas spaced apart from one another by at least a curving portion;
a strain gauge remote from the first and second grip areas;
a first electromechanical connector; and
a pocket shaped and arranged to have a controller removably provided thereto, the controller including a battery, a processor, a transceiver, and a second electromechanical connector configured to physically engage with the first electromechanical connector when the controller is provided to the pocket;
wherein the strain gauge is configured to be powered by the battery and to output to the controller data indicative of a deformation of the training instrument caused by a force applied to the first and second grip areas by a user, when the controller is provided to the pocket, via the first and second electromechanical connectors.

2. The training instrument of claim 1, wherein the strain gauge is provided in the curving portion.

3. The training instrument of claim 1, wherein the strain gauge is provided to the training instrument in a region remote from the curving portion.

4. The training instrument of claim 1, wherein the grip areas are provided at opposing sides of the main body.

5. The training instrument of claim 1, further comprising handgrips provided to the first and second grip areas.

6. The training instrument of claim 1, wherein the main body is U-shaped.

7. The training instrument of claim 1, wherein the transceiver is configured to transmit to an external terminal data generated at the training instrument.

8. The training instrument of claim 1, wherein the transceiver is configured to transmit to an external terminal data indicative of a deformation of the training instrument output from the strain gauge.

9. The training instrument of claim 1, wherein the controller further comprises an inertia sensor configured to be powered by the battery and to output to the controller sensed data, when the controller is provided to the pocket.

10. The training instrument of claim 1, wherein the controller further comprises a user-operable button.

11. The training instrument of claim 10, wherein the user-operable button is a power button.

12. The training instrument of claim 11, wherein the user-operable button is a power button that is usable to turn on power for the training instrument when the controller is provided to the pocket.

13. The training instrument of claim 11, wherein the user-operable button is a power button that is usable to cause the strain gauge to start outputting data when the controller is provided to the pocket and provided that a connection is established between the controller and the training instrument.

14. The training instrument of claim 10, wherein the grip areas are arranged in a first plane in which the training instrument is able to deform, and wherein the button is depressible in a second plane, the first and second planes being orthogonal to one another.

15. The training instrument of claim 1, wherein the controller further comprises a light and/or a speaker configured to be powered by the battery when the controller is provided to the pocket.

16. The training instrument of claim 1, wherein the pocket is formed in a hollow portion of the main body.

17. The training instrument of claim 1, wherein the main body is circularly-shaped.

18. A training instrument, comprising:
a main body comprising first and second grip areas spaced apart from one another by at least a curving portion;
a strain gauge remote from the first and second grip areas; and
a receiving portion configured to have a controller detachably attached thereto, the controller including a battery, a processor, and a transceiver;

wherein the strain gauge is configured to be powered by the battery and to output to the controller data indicative of a deformation of the training instrument caused by a force applied to the first and second grip areas by a user, when the controller is attached to the receiving portion.

19. The training instrument of claim 18, wherein the controller further comprises a user-operable power button.

20. The training instrument of claim 19, wherein the power button is usable to turn on power for the training instrument when the controller is attached to the receiving portion.

21. The training instrument of claim 19, wherein the power button is usable to cause the strain gauge to start outputting data when the controller is attached to the receiving portion and provided that a connection is established between the controller and the training instrument.

22. The training instrument of claim 19, wherein the grip areas are arranged in a first plane in which the training instrument is able to deform, and wherein the power button is depressible in a second plane, the first and second planes being orthogonal to one another.

23. The training instrument of claim 19, wherein the controller further comprises a light and/or a speaker configured to be powered by the battery when the controller is attached to the receiving portion.

24. A training system comprising, comprising:
a controller; and
a training instrument, comprising:
   a main body comprising first and second grip areas spaced apart from one another by at least a curving portion;
   a strain gauge remote from the first and second grip areas;
   a first electromechanical connector; and
   a pocket shaped and arranged to have the controller removably provided thereto, the controller including a battery, a processor, a transceiver, and a second electromechanical connector configured to physically engage with the first electromechanical connector when the controller is provided to the pocket;
wherein the strain gauge is configured to be powered by the battery and to output to the controller data indicative of a deformation of the training instrument caused by a force applied to the first and second grip areas by a user, when the controller is provided to the pocket, via the first and second electromechanical connectors.

25. The training system of claim 24, further comprising an external terminal,
wherein the transceiver of the training instrument is configured to transmit to the external terminal data indicative of a deformation of the training instrument output from the strain gauge.

26. A training system comprising, comprising:
a controller; and
a training instrument, comprising:
   a main body comprising first and second grip areas spaced apart from one another by at least a curving portion;
   a strain gauge remote from the first and second grip areas; and
   a receiving portion configured to have the controller detachably attached thereto, the controller including a battery, a processor, and a transceiver;
wherein the strain gauge is configured to be powered by the battery and to output to the controller data indicative of a deformation of the training instrument caused by a force applied to the first and second grip areas by a user, when the controller is attached to the receiving portion.

27. A training method comprising:
having a training instrument including a main body comprising first and second grip areas spaced apart from one another by at least a curving portion; a strain gauge remote from the first and second grip areas; a first electromechanical connector; and a pocket shaped and arranged to have a controller removably provided thereto, the controller including a battery, a processor, a transceiver, and a second electromechanical connector configured to physically engage with the first electromechanical connector when the controller is provided to the pocket; wherein the strain gauge is configured to be powered by the battery and to output to the controller data indicative of a deformation of the training instrument caused by a force applied to the first and second grip areas by a user, when the controller is provided to the pocket, via the first and second electromechanical connectors; and wherein the controller is provided to the pocket; and
transmitting, to an external terminal via the transceiver, data indicative of a deformation of the training instrument output from the strain gauge.

28. A training method comprising:
having a training instrument including a main body comprising first and second grip areas spaced apart from one another by at least a curving portion; a strain gauge remote from the first and second grip areas; and a receiving portion configured to have a controller detachably attached thereto, the controller including a battery, a processor, and a transceiver; wherein the strain gauge is configured to be powered by the battery and to output to the controller data indicative of a deformation of the training instrument caused by a force applied to the first and second grip areas by a user, when the controller is attached to the receiving portion; and wherein the controller is attached to the receiving portion; and
transmitting, to an external terminal via the transceiver, data indicative of a deformation of the training instrument output from the strain gauge.

* * * * *